(12) United States Patent
Song et al.

(10) Patent No.: US 11,927,609 B2
(45) Date of Patent: Mar. 12, 2024

(54) CONDITION MONITORING VIA ENERGY CONSUMPTION AUDIT IN ELECTRICAL DEVICES AND ELECTRICAL WAVEFORM AUDIT IN POWER NETWORKS

(71) Applicant: University of Georgia Research Foundation, Inc., Athens, GA (US)

(72) Inventors: WenZhan Song, Alpharetta, GA (US); Yang Shi, Athens, GA (US); Fangyu Li, Athens, GA (US); Jin Ye, Bogart, GA (US)

(73) Assignee: UNIVERSITY OF GEORGIA RESEARCH FOUNDATION, INC., Athens, GA (US)

( * ) Notice: Subject to any disclaimer, the term of this patent is extended or adjusted under 35 U.S.C. 154(b) by 141 days.

(21) Appl. No.: 17/312,976

(22) PCT Filed: Dec. 13, 2019

(86) PCT No.: PCT/US2019/066340
§ 371 (c)(1),
(2) Date: Jun. 11, 2021

(87) PCT Pub. No.: WO2020/124010
PCT Pub. Date: Jun. 18, 2020

(65) Prior Publication Data
US 2022/0050130 A1    Feb. 17, 2022

Related U.S. Application Data

(60) Provisional application No. 62/779,735, filed on Dec. 14, 2018, provisional application No. 62/944,032, filed on Dec. 5, 2019.

(51) Int. Cl.
G01R 19/25    (2006.01)
G01R 21/133   (2006.01)
(Continued)

(52) U.S. Cl.
CPC ....... *G01R 19/2513* (2013.01); *G01R 21/133* (2013.01); *G06F 9/4498* (2018.02);
(Continued)

(58) Field of Classification Search
CPC ............... H02J 3/0012; H02J 13/00002; H02J 2203/20; G06Q 10/20; G06Q 50/06;
(Continued)

(56) References Cited

U.S. PATENT DOCUMENTS

| 2010/0085035 | A1 | 4/2010 | Fornage |
| 2012/0137367 | A1 | 5/2012 | Dupont et al. |

(Continued)

FOREIGN PATENT DOCUMENTS

CN    10241538    10/2018

OTHER PUBLICATIONS

Ye et al., CN106241538A, "An Elevator Energy Consumption Online Monitoring System Based on Internet of Things", Date Published: Dec. 21, 2016 (Year: 2016).*

(Continued)

*Primary Examiner* — John H Le
(74) *Attorney, Agent, or Firm* — Thomas | Horstemeyer, LLP

(57) ABSTRACT

Disclosed are various embodiments for an anomaly detection system for detecting and identifying anomalies in electrical devices based on an energy profile associated with the electrical devices. Energy profile data associated with electrical devices or components in a power network can be obtained using an energy meter. The energy profile data can be analyzed to determine one or more conditions of the electrical devices. An anomaly of the electrical devices can be determined based on the energy profile data and conditions. Further, a root cause of the anomaly can be determined.

20 Claims, 12 Drawing Sheets

(51) Int. Cl.
| | |
|---|---|
| G06F 9/448 | (2018.01) |
| G06F 11/07 | (2006.01) |
| G06Q 50/06 | (2012.01) |
| H02J 13/00 | (2006.01) |
| H04L 9/40 | (2022.01) |

(52) U.S. Cl.
CPC ........... *G06F 11/079* (2013.01); *G06Q 50/06* (2013.01); *H02J 13/00002* (2020.01); *H04L 63/1416* (2013.01)

(58) Field of Classification Search
CPC ... H04L 63/1416; G06F 9/4498; G06F 1/079; G06F 11/079; G01R 21/133; G01R 19/2513; Y02E 60/00; Y04S 10/30; Y04S 10/50; Y04S 40/20
USPC .......................................................... 702/60
See application file for complete search history.

(56) References Cited

U.S. PATENT DOCUMENTS

| | | | |
|---|---|---|---|
| 2013/0110621 | A1 | 5/2013 | Gupta |
| 2016/0261465 | A1* | 9/2016 | Gupta ................. H04L 43/08 |
| 2016/0366170 | A1 | 12/2016 | Bell |
| 2018/0306476 | A1 | 10/2018 | Brady et al. |
| 2019/0311443 | A1* | 10/2019 | Blades ................. H04L 9/3239 |

OTHER PUBLICATIONS

Fangyu Li; Yang Shi; Aditya Shinde; Jin Ye; WenZhan Song; "Enhanced Cyber-physical Security in Internet of Things through Energy Auditing" IEEE Internet of Things Journal, 2019.

Yang Shi; Fangyu Li; WenZhan Song; Xiang-Yang Li; Jin Ye; "Energy Audition based Cyber-Physical Attack Detection System in IoT"; ACM Turning Celebration Conference TURC, Sigmobile, 2019.

Fangyu Li; Rui Xie; Zengyan Wang; Lulu Guo; Jin Ye; Ping Ma; WenZhan Song; "Online Distributed IoT Security Monitoring with Multidimensional Streaming Big Data", IEEE Internet of Things Journal, pp. 1-8, 2020, ISSN: 2372-2541.

Fangyu Li; Aditya Shinde; Yang Shi; Jin Ye; Xiang-Yang Li; WenZhan Song, "System Statistics Learning-Based IoT Security: Feasibility and Suitability", IEEE Internet of Things Journal, 2019.

L. Atzori, A. Iera, and G. Morabito, "The internet of things: A survey," Computer Networks, vol. 54, No. 15, pp. 2787-2805, Oct. 2010.

S. Mansfield-Devine, "Securing the internet of things," Computer Fraud & Security, vol. 2016, No. 4, pp. 15-20, Apr. 2016.

T. M. Chen and S. Abu-Nimeh, "Lessons from stuxnet," Computer, vol. 44, No. 4, pp. 91-93, Apr. 2011.

L. Bilge and T. Dumitras, "Before we knew it," in Proceedings of the 2012 ACM conference on Computer and communications security—CCS '12, ser. CCS '12. New York, NY, USA: ACM Press, 2012, pp. 833-844.

"KDD cup 1999 data." [Online]. Available: http://kdd.ics.uci.edu/databases/kddcup99/kddcup99.html.

C. Elkan, "Results of the KDD'99 classifier learning," ACM SIGKDD Explorations Newsletter, vol. 1, No. 2, pp. 63-64, Jan. 2000.

M. Tavallaee, E. Bagheri, W. Lu, and A. A. Ghorbani, "A detailed analysis of the KDD CUP 99 data set," in 2009 IEEE Symposium on Computational Intelligence for Security and Defense Applications. IEEE, Jul. 2009, pp. 1-6.

Z. Ruan, Y. Miao, L. Pan, N. Patterson, and J. Zhang, "Visualization of big data security: a case study on the KDD99 cup data set," Digital Communications and Networks, vol. 3, No. 4, pp. 250-259, Nov. 2017.

J. Z. Kolter and M. J. Johnson, "REDD: A public data set for energy disaggregation research," in in SustKDD, 2011.

J. Mairal, F. Bach, J. Ponce, and G. Sapiro, "Online dictionary learning for sparse coding," in Proceedings of the 26th Annual International Conference on Machine Learning—ICML '09, ser. ICML '09. New York, NY, USA: ACM Press, 2009, pp. 1-8.

J. Z. Kolter, S. Batra, and A. Y. Ng, "Energy disaggregation via discriminative sparse coding," in Advances in Neural Information Processing Systems 23 (NIPS 2010), 2010.

M. Wytock and J. Z. Kolter, "Contextually supervised source separation with application to energy disaggregation," in Twenty-Eighth AAAI Conference on Artificial Intelligence, 2014.

N. Batra, J. Kelly, O. Parson, H. Dutta, W. Knottenbelt, A. Rogers, A. Singh, and M. Srivastava, "Nilmtk," in Proceedings of the 5th international conference on Future energy systems—e-Energy '14, ser. e-Energy '14. New York, NY, USA: ACM Press, Apr. 2014, pp. 265-276.

E. Elhamifar and S. Sastry, "Energy disaggregation via learning powerlets and sparse coding," in Twenty-Ninth AAAI Conference on Artificial Intelligence, 2015.

A. Majumdar and R. Ward, "Robust dictionary learning: Application to signal disaggregation," in 2016 IEEE International Conference on Acoustics, Speech and Signal Processing (ICASSP). IEEE, Mar. 2016, pp. 2469-2473.

A. P. Varga and R. K. Moore, "Hidden markov model decomposition of speech and noise," in International Conference on Acoustics, Speech, and Signal Processing. IEEE, 1990, pp. 845-848.

E. Athanasopoulou, L. Li, and C. N. Hadjicostis, "Maximum likelihood failure diagnosis in finite state machines under unreliable observations," IEEE Transactions on Automatic Control, vol. 55, No. 3, pp. 579-593, Mar. 2010.

H. Kim, M. Marwah, M. Arlitt, G. Lyon, and J. Han, Unsupervised Disaggregation of Low Frequency Power Measurements. Philadelphia, PA: Society for Industrial and Applied Mathematics, Apr. 2011, pp. 747-758.

W. B. Frakes and R. Baeza-Yates, Information Retrieval: Data Structures and Algorithms. Prentice Hall PTR, Jun. 1992.

H. E. Garcia, M. F. Simpson, W.-C. Lin, R. B. Carlson, and T.-S. Yoo, "Application of process monitoring to anomaly detection in nuclear material processing systems via system-centric event interpretation of data from multiple sensors of varying reliability," Annals of Nuclear Energy, vol. 103, pp. 60-73, May 2017.

P. Zhao, S. Shu, F. Lin, and B. Zhang, "Detectability measure for state estimation of discrete event systems," IEEE Transactions on Automatic Control, p. 1, 2018.

N. R. Potlapally, S. Ravi, A. Raghunathan, and N. K. Jha, "Analyzing the energy consumption of security protocols," in Proceedings of the 2003 international symposium on Low power electronics and design—ISLPED '03. ACM Press, 2003, pp. 30+.

A. S. Wander, N. Gura, H. Eberle, V. Gupta, and S. C. Shantz, "Energy analysis of Public-Key cryptography for wireless sensor networks," in Third IEEE International Conference on Pervasive Computing and Communications, vol. 0. Los Alamitos, CA, USA: IEEE, Mar. 2005, pp. 324-328.

J. Norman, H. L. MacLean, and C. A. Kennedy, "Comparing high and low residential density: Life-Cycle analysis of energy use and greenhouse gas emissions," Journal of Urban Planning and Development, vol. 132, No. 1, pp. 10-21, Mar. 2006.

Y. Wang, A. Pandharipande, and P. Fuhrmann, "Energy data analytics for nonintrusive lighting asset monitoring and energy disaggregation," IEEE Sensors Journal, vol. 18, No. 7, pp. 2934-2943, Apr. 2018.

K. Zhou and S. Yang, "Understanding household energy consumption behavior: The contribution of energy big data analytics," Renewable and Sustainable Energy Reviews, vol. 56, pp. 810-819, Apr. 2016.

S. Hangal and M. S. Lam, "Tracking down software bugs using automatic anomaly detection," in Proceedings of the 24th international conference on Software engineering—ICSE '02. ACM Press, 2002, pp. 291+.

S. Singh, H. Tu, W. Donat, K. Pattipati, and P. Willett, "Anomaly detection via Feature-Aided tracking and hidden markov models," IEEE Transactions on Systems, Man, and Cybernetics—Part A: Systems and Humans, vol. 39, No. 1, pp. 144-159, Jan. 2009.

(56) References Cited

OTHER PUBLICATIONS

B. Baingana and G. B. Giannakis, "Joint community and anomaly tracking in dynamic networks," IEEE Transactions on Signal Processing, vol. 64, No. 8, pp. 2013-2025, Apr. 2016.
Y. Li, Z. Ni, and Y. Tian, "Arrival-time picking method based on approximate negentropy for microseismic data," Journal of Applied Geophysics, vol. 152, pp. 100-109, May 2018.
V. Satopaa, J. Albrecht, D. Irwin, and B. Raghavan, "Finding a "kneedle" in a haystack: Detecting knee points in system behavior," in 2011 31st International Conference on Distributed Computing Systems Workshops. IEEE, Jun. 2011, pp. 166-171.
S. Tan, W.-Z. Song, M. Stewart, J. Yang, and L. Tong, "Online data integrity attacks against real-time electrical market in smart grid," IEEE Transactions on Smart Grid, 2016.
S. Tan, W.-Z. Song, M. Stewart, and L. Long, "Lpattack: Leverage point attacks against state estimation in smart grid," in Global Communications Conference (GLOBECOM), 2014 IEEE. IEEE, 2014, pp. 643-648.
39 L. Zhao, W.-Z. Song, L. Tong, Y. Wu, and J. Yang, "Topology identification in smart grid with limited measurements via convex optimization," in Innovative Smart Grid Technologies-Asia (ISGT Asia), 2014 IEEE. IEEE, 2014, pp. 803-808.
S. Tan, W.-Z. Song, M. Stewart, and L. Tong, "Construct data integrity attacks against real-time electrical market in smart grid," in Smart Grid Communications (SmartGridComm), 2015 IEEE International Conference on. IEEE, 2015, pp. 398-403.
L. Zhao, W.-Z. Song, L. Tong, and Y. Wu, "Monitoring for Power-Line change and outage detection in smart grid via the alternating direction method of multipliers," in Advanced Information Networking and Applications Workshops (WAINA), 2014 28th International Conference on. IEEE, 2014, pp. 342-346.
L. Zhao and W.-Z. Song, "A new multi-objective microgrid restoration via semidefinite programming," in Performance Computing and Communications Conference (IPCCC), 2014 IEEE International. IEEE, 2014, pp. 1-8.
"Distributed power-line outage detection based on wide area measurement system," Sensors, vol. 14, No. 7, pp. 13-114-13 133, 2014.
L. Xie, Y. Xie, S.-M. Wu, F.-C. Lin, and W. Song, "Communication efficient signal detection for distributed ambient noise imaging," in the 52nd Asilomar Conference on Signals, Systems and Computers, 2018.
International Search Report in co-pending, related PCT Application No. PCT/US2019/066340, dated Mar. 2, 2020.

* cited by examiner (a) Positive Sequence  (b) Negative Sequence  (c) Zero Sequence

CONDITION MONITORING VIA ENERGY CONSUMPTION AUDIT IN ELECTRICAL DEVICES AND ELECTRICAL WAVEFORM AUDIT IN POWER NETWORKS

CROSS REFERENCE TO RELATED APPLICATIONS

This application claims priority to, and the benefit of, co-pending PCT Application No. PCT/US2019/066340, entitled "CONDITION MONITORING VIA ENERGY CONSUMPTION AUDIT IN ELECTRICAL DEVICES AND ELECTRICAL WAVEFORM AUDIT IN POWER NETWORKS", filed Dec. 19, 2019, which claims priority to U.S. provisional application entitled "ANOMALY DETECTION VIA ENERGY CONSUMPTION AUDIT IN DEVICES AND ELECTRICAL WAVEFORM AUDIT IN POWER NETWORKS," having Ser. No. 62/779,735, filed on Dec. 14, 2018, and U.S. provisional application entitled "ANOMALY DETECTION VIA ENERGY CONSUMPTION AUDIT IN DEVICES AND ELECTRICAL WAVEFORM AUDIT IN POWER NETWORKS," having Ser. No. 62/944,032, filed on Dec. 5, 2019, and, all of which are hereby incorporated by reference in their entirety.

BACKGROUND

Internet of Things (IoT) devices are widely deployed around the world these days, yet they are vulnerable to cyber or physical attacks. The attacks may lead to the failure of critical devices, and pose significant safety concerns of the society. For instance, in March 2015, Chrysler recalled more than 1.4 million Jeep cars to fix the potential weaknesses of onboard systems. Similarly, a virus named Stuxnet has also caused loss for the Bushehr Nuclear Power Plant in 2010.

SUMMARY

Aspects of the present disclosure are related to an anomaly detection system for detecting and identifying anomalies in electrical devices based on an energy profile associated with the electrical devices.

In one aspect, among others, a system, comprises an electrical device coupled to a network. The system further comprises an energy meter coupled to with the electrical device. The energy meter device is configured to monitor an energy profile of the electrical device. The system can also include at least one application executable in a computing device coupled to the energy meter. When executed, the at least one application can cause the computing device to at least: analyze energy profile data of the electrical device, the energy profile data being received from the energy meter based on the monitoring of the energy profile; monitor one or more conditions of the electrical device based on the energy profile data; and detect one or more anomaly in the electrical device based on a change in the one or more conditions, and diagnose one or more root causes of the one or more anomaly based at least in part on one or more characteristics in the energy profile data.

In various aspects, the energy profile data includes at least one of voltage measurements, current measurements, or power measurements. In various aspects, analyzing the energy profile data comprises comparing the energy profile data with one or more energy profile model. In various aspects, when executed, the at least one application further causes the at least one computing device to at least identify a type of attack associated with the anomaly based at least in part one or more characteristics in the energy profile data.

In various aspects, detection of the anomaly is based at least in part on Finite State Machine (FSM) reconstruction. In various aspects, when executed, the at least one application further causes the at least one computing device to at least reconstruct an energy profile model based at least in part on the energy profile data. In various aspects, detection of the anomaly is based at least in part on cross-correlation. In various aspects, the electrical device comprises an internet of things (IoT) device or an electrical appliance. In various aspects, analyzing the energy profile data further comprises analyzing waveform data associated with the electrical device. In various aspects, the anomaly is a result of a cyber-attack, a physical attack, a hardware malfunction, or a software malfunction.

In another aspect, a method for detecting an anomaly in an electrical device, comprises monitoring, via an energy meter coupled to the electrical device, energy profile data of the IoT device; comparing the energy profile data with one or more energy profile models; and detecting an anomaly associated with the electrical device based at least in response to the comparing of the energy profile data with the one or more energy profile models.

In various aspects, the energy profile data comprises at least one or more of voltage data, current data, or power data. In various aspects, the method further comprises identifying a type of attack associated with the anomaly based at least in part on one or more characteristics in the energy profile data. In various aspects, detection of the anomaly is based at least in part on cross-correlation. In various aspects, detection of the anomaly is based at least in part on Finite State Machine (FSM) reconstruction. In various aspects, the method further comprises notifying an entity of the detection of the anomaly. In various aspects, the anomaly is a result of a cyber-attack, a physical attack, hardware malfunction, or software malfunction.

In another aspect, a system includes a power network comprising a plurality of electrical components; and an electrical waveform auditing device coupled to the power network. The electrical waveform auditing device is configured to receive electrical waveform data associated with the power network; monitor one or more conditions of the plurality of electrical components in the power network based on the electrical waveform data; detect an anomaly in at least one of the electrical components based at least in part on a change in the one or more conditions; and diagnose one or more root causes of the anomaly based at least in part on one or more characteristics in the electrical waveform data.

In various aspects, the power network comprises at least one of: an electrical vehicle power network, a home power network, a building power network, a manufacturing system power network, a microgrid, a power distribution network, a power transmission network, or a power generating network. In various aspects, the type of anomaly is at least one of: a cyber threat, a physical threat, a hardware malfunction, or a software malfunction.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

The foregoing will be apparent from the following more particular description of example embodiments of the present disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

The present disclosure relates to an anomaly detection system for detecting and identifying anomalies in electrical devices based on an energy profile associated with the electrical devices. An electrical device can comprise a computing device, internet of things (IoT) device, electrical components, and/or any other type of electrical device. For example, a health of an electrical device can be determined from a monitored energy profile. In some examples, an anomaly can occur as a result of a cyber threats in electrical devices and systems. In other examples, an anomaly can be a result of a malfunction of the hardware or software of the electrical device.

Figure 1:
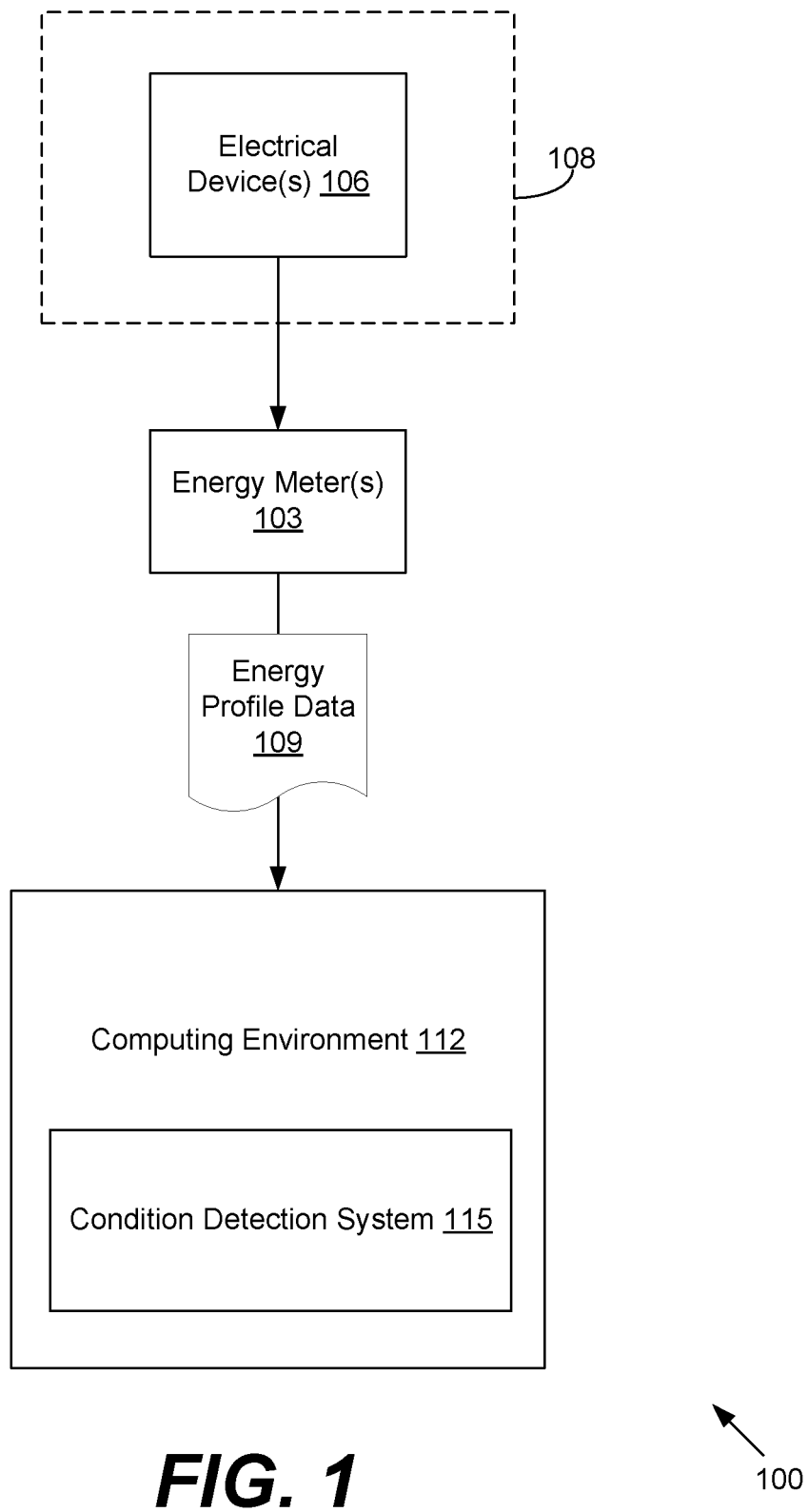
FIG. 1 is a schematic block diagram of an anomaly detection system according to various embodiments of the present disclosure.

Turning now to FIG. 1, shown is an example framework of an anomaly detection system 100 according to various embodiments of the present disclosure. As shown in FIG. 1, the anomaly detection system 100 comprises an energy meter 103 coupled to one or more electrical devices 106 (e.g., IoT device, electrical components). In some examples, the one or more electrical devices 106 may be part of a power network 108. The energy meter 103 can be coupled to the electrical device 106 through a wired or wireless connection. The energy meter 103 is configured to monitor the energy profile of the electrical device 103 and system, with the goal of detecting and identifying a condition that may indicate a cyber and/or physical attack to the device 106 or a malfunction associated with the functioning of the device 106. The energy meter 103 can transmit monitored energy profile data 109 to a computing environment 112 configured to analyze the energy profiles and detect anomalies in the profiles. For example, cyber or physical attacks can cause damages or threats that will likely cause a change on the energy consumption profile of one or more elements of an electrical device 106, including sensing, computing, communication and storage related hardware and software. In another example, a malfunction of the hardware and/or software of the electrical device 106 can also cause a change of the energy consumption profile. Through monitoring of the changes in the energy profile, the condition and root cause (e.g., threat source, malfunctioning component, etc.) can be detected and identified.

The computing environment 112 may comprise, for example, a server computer or any other system providing computing capability. Alternatively, the computing environment 112 may employ a plurality of computing devices that may be arranged, for example, in one or more server banks or computer banks or other arrangements. Such computing devices may be located in a single installation or may be distributed among many different geographical locations. For example, the computing environment 112 may include a plurality of computing devices that together may comprise a hosted computing resource, a grid computing resource, and/or any other distributed computing arrangement. In some cases, the computing environment 112 may correspond to an elastic computing resource where the allotted capacity of processing, network, storage, or other computing-related resources may vary over time.

Various applications and/or other functionality may be executed in the computing environment 112 according to various embodiments. Also, various data is stored in a data store that is accessible to the computing environment 203. The data store may be representative of a plurality of data stores as can be appreciated. The data stored in the data store for example, is associated with the operation of the various applications and/or functional entities described below.

The components executed on the computing environment 112, for example, include a condition detection system 115, and other applications, services, processes, systems, engines, or functionality not discussed in detail herein. The condition detection system 115 is executed to receive the energy profile data 112 from the energy meter 103 and analyze the energy profile data 112 to detect anomalies in energy profile data 112 that can occur as a result of a condition associated with the electrical device 106. For example, the condition can be the result of a cyber attack, physical attack, hardware malfunction, software malfunction, and/or other condition as can be appreciated. According to various embodiments, the condition detection system 115 can also determine the root cause of the condition based on the analysis of the energy profile data 109.

Example 1

Data analysis based security has been a popular topic through recent years. For example, KDD released a dataset that uses the network measurements to classify anomalies or attacks. The dataset was used for a challenge in KDD '99 conference. The data are categorized into five classes, and the teams are required to classify the attacking category given a data sample. For this dataset, the nearest neighbor method works best. However, the network traffic can be overloaded and the data can be biased towards certain analyzing methods.

Another known technique includes a big data visualization method, which uses KDD 99' data as a study case. The data analytics based security has been researched over the years. Some known techniques have focused on using energy utilities data, for example Reference Energy Disaggregation Data Set (REDD), for component disaggregation. The target is that by using the energy data, to know how each component of the energy utilities work.

The most popular known methods are based on dictionary learning and sparse coding. One known technique uses dictionary learning for energy disaggregation. The accuracy for REDD dataset of this method is mediocre, but still performs better than the available methods that time. Other known methods have been proposed to fit into energy disaggregation tasks. For example, a contextual supervised method for energy disaggregation achieved low mean average error in the self-developed loss function in both synthetic and Pecan Street dataset. Another known method uses a subgroup of the appliances in REDD dataset as the dictionary for the sparse coding. This method indicates that the data itself is a good source of dictionaries for the sparse coding in energy data.

Another robust known technique of using dictionary learning minimizes the l1-norm rather than l2-norm, in the signal disaggregation problem and achieves a more stable result in the energy disaggregation use case. Another methodology for anomaly detection is Finite State Machine (FSM) and Hidden Markov Model (HMM). This method is based on states and the reconstruction of the state machine and compares the reconstructed state machine to determine whether the system is in an anomalous status. This method uses HMM to reconstruct the sequences of the states by the data in a system, then determines whether the system in under abnormal situation by comparing the model it reconstructed and the true model that the system is supposed to be. This comparison idea has extended for more works on using HMM in anomaly detection problem, and is mainly based on the multi-sensor situation. In another known method, the HMM method is used in the energy disaggregation problem. The traditional HMM is extended into Conditional Factorial Hidden Semi-Markov Model (CFHSMM), and achieves a higher performance in F-measure than the previous methods.

Additional known techniques are based on this multi-sensor based algorithm. In some known examples, the anomaly detection framework is applied in the nuclear power plant for monitoring. In some known examples, state based methods are broadly used in anomaly detection for the sake that states are clearer to be detected in applications. On the other hand, other known examples link the energy data analytics and security together. The exploration into the relationship of security and energy data has been analyzed from cyber areas to physical security concerns. In physical security applications, energy data has been used to analyze the population density. Energy usage data has also been used to analyze household behaviors. In one known method a framework for using energy data to monitor lighting assets uses a clustering method based source disaggregation method. This known framework includes a hardware based testbed, which further pushes the research in using energy data in security applications further. These different methods show the availability of energy data in different application situations. There are also algorithms for tracking the anomalies, especially attacking patterns. One known method includes a way to track the anomalies in software by implementing a platform in Java to check the code of software in order to find the anomalies automatically. Another known technique includes an HMM based model for anomaly tracking in multi-nodes. Cross-correlation is a widely used method for event delay time calculation, especially for the earthquake wave calculation. According to various embodiments, the system of the present disclosure is based on the single node anomaly detection, and uses cross-correlation inspired by the seismic arrival picking methods.

Internet of Things (IoT) devices are widely deployed around the world these days, yet they are vulnerable to cyber or physical attacks. The attacks may lead to the failure of critical devices, and pose significant safety concerns of the society. For instance, in March 2015, Chrysler recalled more than 1.4 million Jeep cars to fix the potential weaknesses of onboard systems. Similarly, a virus named Stuxnet has also caused loss for the Bushehr Nuclear Power Plant in 2010. An efficient method is needed for detecting threats in a fast and accurate fashion. Furthermore, in some situations like zero-day attack, the characteristics are not previously known. Usually when cyber or physical attacks happen, some anomalies show up in the system. Cyber-attacks are the attacks that use network connection as the intrusion way, while physical attacks use physical ways to attack the devices. Knowing anomalies can help determine the possible attacks. Previously, the detection of anomaly is mainly based on software or hardware, and since the characteristic of zero-day attacks, traditional detections will be inefficient for this problem. The data analytics based method also has its limitation. In situations where the attacks compromise the kernel, the data used for analysis is not accurate or trustworthy. Accordingly, it can be beneficial to detect anomalies by using energy audit outside the IoT device as monitors, along with the system information data collected by system statistics software such as, for example, collectd.

Cyber or physical attacks/faults will likely leave a trace on the energy profile of electrical devices or electrical appliances/equipment. The anomaly detection system 100 of the present disclosure can audit and analyze energy profile data 109, with the goal of detecting anomaly and locating the source of attacks/faults in real time. Energy profile data 109 may include voltage, current and power measurements, as well as the raw AC electrical waveform measurements. For different applications, the sampling rate and resolution requirement may be different. IoT devices are typically powered by DC power supply (e.g., 5V DC) and each hardware subcomponent runs at very low power. As such, only the power consumption measurement is needed but at high resolution (e.g., mA or mW resolution) to be able to disaggregate. For IoT-enabled electrical appliances/equipment, which are powered by AC power, besides active and reactive power measurements, the power harmonics is an important concern. As such, the sampling rate typically needs to be 10 KHz or higher to capture the waveform details of harmonics. Advanced physics-based and data-driven analytics are included in the system of the present disclosure to detect anomalies and locate the attack/fault sources.

According to various embodiments, the anomaly detection system 100 can comprise one or more energy meters 103 that are isolated from a system (e.g., IOT system) including electrical devices 106. In some embodiments the energy meters 103 can be designed into the hardware and software architecture of the electrical devices 106. In some embodiments, the energy meter(s) 103 communicates with the electrical system via a communication channel that is separate from the communication channel of the data network. In other embodiments, the energy audit system communicates with an electrical device 106 or a system of electrical devices 106 via the same communication channel.

According to various embodiments, energy profile models can be created based on expected behavior of an electrical device 106. The energy profile models can built and categorized according to device types, user types, and/or other. The energy profile can include power consumption data and/or other types of data that can be used to detect anomalies associated with the particular device. According to various embodiments of the present disclosure, the energy meters 103 are configured to monitor the energy profile of a particular device 106 and transmit monitored data to a computing environment 112 configured to analyze the energy profiles with respect to energy profile models that are built based at least in part on expected behavior. Anomalies detected in a comparison between the energy profile and the energy profile models can correspond to a possible security and/or physical attack. Different types of attacks can be categorized according to characteristics in the energy profile. As such, according to various embodiments, an energy audit system can identify a type of attack based at least in part on the characteristics in the energy profile.

In some embodiments, a user interface can be used to verify questionable activity. For example, upon detecting a potential attack according to the energy profile, the energy audit system can notify a user, via a user interface, of the potential attack. The user can provide feedback regarding whether the changes in the energy profile can be explained due to known activity of the user.

One implementation of the anomaly detection system 100 can be based on Finite State Machine (FSM) reconstruction to identify the anomaly. According to various embodiments, an electrical device 106 can comprise sensing, computing, storage and communication elements. Each of those components consume energies at different rates and patterns. The pattern is driven by the Finite State Machine (FSM) of its software, and different IOT applications often have different energy consumption patterns. Similarly, an electrical appliance/equipment has its energy consumption signature driven by its finite running states, and different type of appliances/equipment often have different energy consumption patterns. The basic idea is to construct Finite State Machine (FSM) via Hidden Markov Model (HMM). This method is based on states and the reconstruction of the state machine, then compare the reconstructed state machine to determine whether the system is in an anomalous state.

Safety failures on critical devices 106 for Internet of Things (IoT) systems can pose challenges with respect to securing the critical electrical devices 106 in an efficient and accurate way. Compared to traditional software based anomaly detection methods, data-analytic based methods can detect anomalies with zero-day characters without rewriting the algorithm. The energy audit based security mechanism for of the present disclosure is novel. The most related known techniques are power disaggregation. The goal of the known techniques is to disaggregate the whole house energy measurement to individual component's energy consumption, and identify each individual appliance energy consumption. The most popular known methods are based on dictionary learning and sparse coding. For example, one known technique used dictionary learning for energy disaggregation and other known methods fit into energy disaggregation tasks. These known techniques cannot directly apply to an IoT device for disaggregation, because the state transition in IoT software is far more dynamic and fast. Furthermore, one goal of the present disclosure is detect anomaly and locate the source of attack/fault, which have not been attempted before.

The present disclosure relates to a data analytic based framework that uses energy meter data to detect anomalies on electrical devices 106. After detection, the anomaly data is gathered and performed with analysis for anomaly path tracking. Compared with traditional energy disaggregation based detection, the method of the present disclosure is more specified for electrical device 106 such as, for example, IoT devices and/or cyber devices. The present disclosure demonstrates the role of outside monitors in IoT security and provides more possible future research opportunities in this area.

Figure 2:
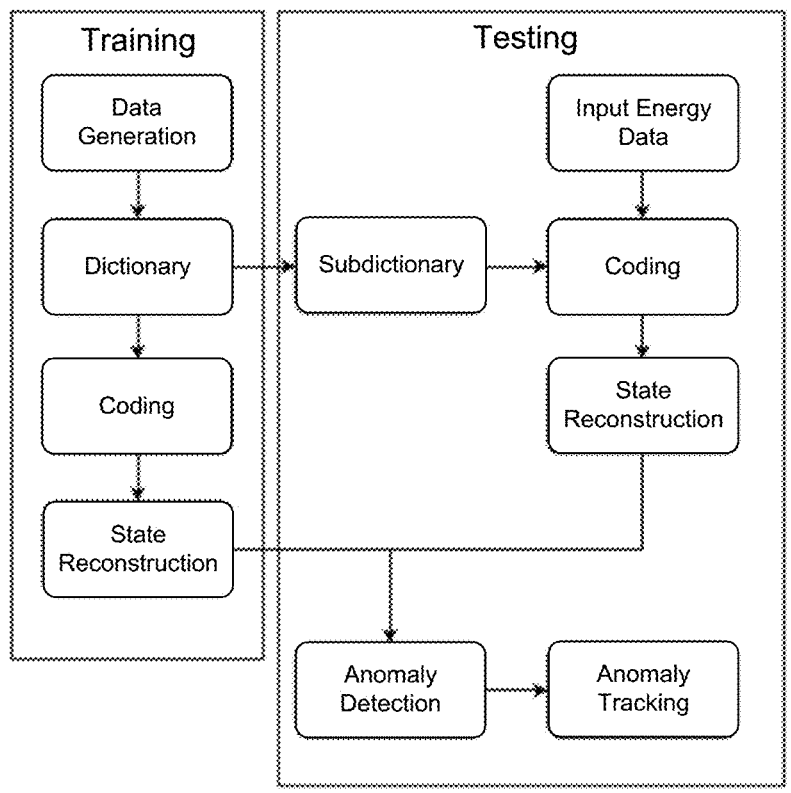
FIG. 2 illustrates an example of a flowchart for anomaly detection in multinode electrical systems according to various embodiments of the present disclosure.

FIG. 2 illustrates an example of a flowchart for anomaly detection in multinode IoT systems according to various embodiments of the present disclosure. A typical electrical device 106 can be composed of sensors, CPU, memory, storage and network connections. In various implementations, an energy meter 103 is added to the outside of the device 106. The energy meter 103 is configured to monitor the energy consumption of the device 106. The readings of energy meters 103 is then sent to a designated device or computing environment 112 that is configured to analyze the security and/or health situation of the monitored devices 106. Along with the energy meter readings, the system statistics collected by a systems statistics module (e.g., collectd) is also sent to the analyzing device 112. According to various implementations, the condition detection system 115 can be trained with the correct FSM transitioning graphs. After the new batches of data arrive, the condition detection system 115 can reconstruct the transitioning graph and compare the reconstructed graph with the trained one to determine whether the system is in an abnormal situation. Once trained with the dictionaries, the system 100 of the present disclosure may only use the energy meter data 109 to detect system anomalies for the node. In some implementations, after the single node anomaly detection, the anomaly spreading route can be traced.

Algorithm Design

Dictionary Generation and Mapping

Figure 3:
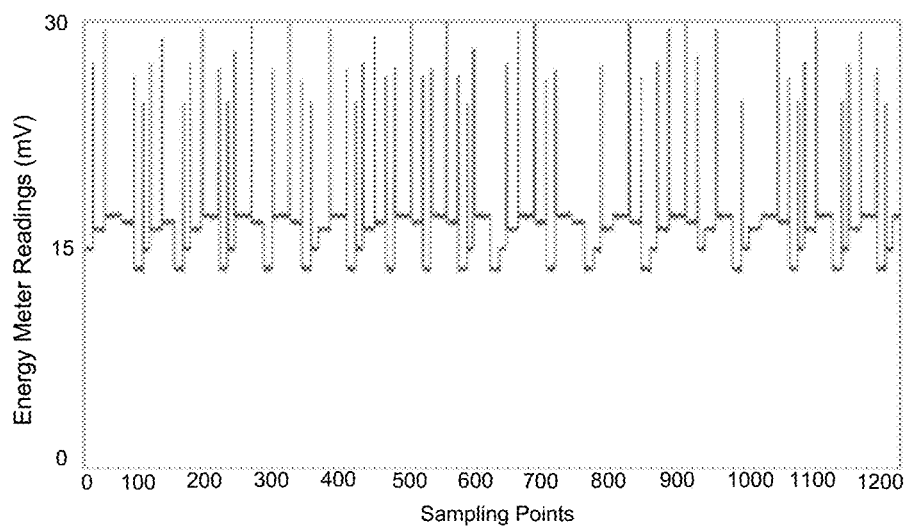
FIG. 3 illustrates an example of the input signal according to various embodiments of the present disclosure.

FIG. 3 illustrates an example of the input signal according to various embodiments of the present disclosure. In particular, FIG. 3 illustrates the synthetic data generated for the framework of the present disclosure. The input signal sequence is denoted as S. The readings keep stable when reached the state, and in the transition, in some sampling points the states are overlapped by the neighboring states. The synthetic signal includes a white noise, and the overlaps of the states are introduced since we assume the situation when the sampling frequency is not as high as the frequency of state changes. In the overlapped states, the readings are much higher than the normal readings for a single state. Thus a k-means algorithm can be used to separate the two kinds of samples. k is set to 2 in this example. After separating the overlapped and non-overlapped states, the clusters with less readings can be labeled as overlapped and the non-overlapped states are used to get the dictionaries.

Assuming that the exact state numbers in the observed data is not known. To figure out the total state number, the Kneedle algorithm described in V. Satopaa, J. Albrecht, D. Irwin, and B. Raghavan, "Finding a "kneedle" in a haystack: Detecting knee points in system behavior," in 2011 31st International Conference on Distributed Computing Systems Workshops. IEEE, June 2011, pp. 166-171 is applied to determine the best dictionary value in the clustering. k-means on the non-overlapped data $S_{dict}$ can be used to get the centroid of each cluster C as the dictionary D= $[d_1, d_2, \ldots, d]$, $D \in \mathbb{R}^{M \times K}$. The dictionary D can be combined into the combinations of all possible two dictionaries sum up and concatenated into the original Dictionary D, denoted as $D_0$. Then the mapping is performed on the observed data. The optimization problem is written as $l = \min \|Dx - s\|_2$.

s.t. $x \in \mathbb{Z}_+^{K \times T}$ (1)

To solve the optimization problem, since the dictionary D is defined, and the mapping $x \in \mathbb{Z}_+^{K \times T}$, all possible combinations of the mappings can be reviewed, and the l2-norm can be minimized to get the estimated mappings. The details for solving the optimization problem are provided in Algorithm 1.

| Algorithm 1 Dictionary Generation and Mapping | |
|---|---|
| 1: | procedure DGM(S) |
| 2: | $k_{DGM}$ = arg max$_k$ (Count (K–means(S, k = 2))) |
| 3: | $S_{dict}$ = S(K = $k_{DGM}$) |
| 4: | C = K–means($S_{dict}$, k = Kneedle($S_{dict}$)) |
| 5: | D = C.centers |
| 6: | c = 1 |
| 7: | for q = 1 to length(D) − 1 do |
| 8: |   for p = q + 1 to length(D) do |
| 9: |     $D_o$(c) = D(p) + D(q) |

| Algorithm 1 Dictionary Generation and Mapping | |
|---|---|
| 10: |     c = c + 1 |
| 11: |   end for |
| 12: | end for |
| 13: | $D_o$ = [D,$D_o$] |
| 14: | for j = 1 to length(S) do |
| 15: |   $x_{seq}$(j) = arg min$_i$ ||$D_o$(i) − S(j)|| |
| 16: | end for |
| 17: | Recover the mapping x from $x_{seq}$ |
| 18: | end procedure |

State Reconstruction

Figure 4:
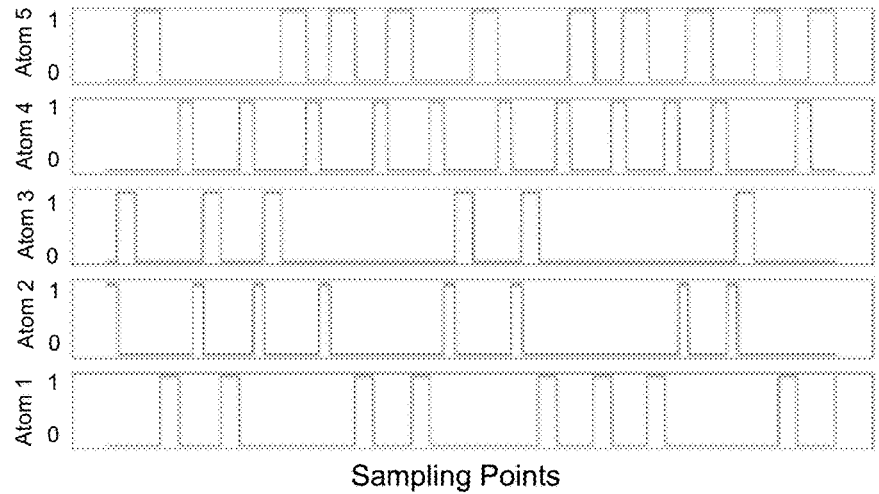
FIG. 4 illustrates a graphical representation of a mapping of every cluster to the data according to various embodiments of the present disclosure.

The result of optimization above is the mapping x of the observed signal s to the dictionary D, as shown in FIG. 4. In particular, FIG. 4 illustrates a graphical representation of a mapping of every cluster to the data. As shown in FIG. 4, two cluster mappings may overlap at the same sampling point.

In some implementations, the mappings are be rewritten into a more generalized format where the length of every state is also collected to further clustering the real states. It should be noticed that in the framework of the present disclosure, it is not assumed that every state has the different readings. In some examples, two states with same readings can further be distinguished by the length of states. In order to process this information, the length is collected with the value of each state to perform another clustering process to decide the total number of the states, and mapping them into a sequence. According to various implementations, the Kneedles algorithm can be used to determine the total number of states, and k-means can be used to generate the state sequence.

The main issue of the anomaly detection problem is the reconstruction of the transition matrix P. If the states length or value are not the same as the original observation, then the anomaly is detected. But if the length and the value are the same, the FSM graph can be reconstructed to see the transition matrix to determine whether there is an anomaly or not. In some implementations, the Bayesian inference can be used to reconstruct the transition matrix. According to various implementations, the frequency of every state can be counted in the reconstructed sequence, denoted as $\hat{P}(S') = [p(s_1), p(s_2), \ldots, p(s_N)]$ and the frequency of every state after another can be counted, denoted as $\hat{P}(S,S') = [p(s, s_1), p(s, s_2), \ldots, p(s, s_N)]^T$. The observed transition matrix is calculated as $$\hat{P}(S|S') = \frac{\hat{P}(S, S')}{\hat{P}(S')}, \quad (2)$$

The singular value decomposition (SVD) can then be used to get the eigenvalue of the reconstructed matrix to compare with the true transition matrix. A threshold θ is, and when $\|svd(\hat{P}(S|S')) - svd(P)\|_2 > \theta$, the current observation can be labeled as an anomalous one.

Algorithm 2 provides an algorithm for state reconstruction based anomaly detection. The target of the framework is to only use the energy meter for the anomaly detection, thus we introduce the framework that only use energy meter for the state reconstruction.

| Algorithm 2 State Reconstruction based Anomaly Detection |
| --- |
| 1: procedure DETECTION(x, θ) |
| 2:    Arrange x into sequence $S_{re}(k, 1)$ |
| 3:    $C_{re}$ = K-means($S_{re}$, k = Kneedle($S_{re}$)) |
| 4:    S' = $C_{r_g}$ · cluster_result |
| 5:    Count $\hat{P}$(S') and $\hat{P}$(S, S') |
| 6:    $\hat{P}(S \mid S') = \dfrac{\hat{P}(S, S')}{\hat{P}(S')}$ |
| 7:    if $\|\mathrm{svd}(\hat{P}(S\mid S')) - \mathrm{svd}(P)\|_2 > \theta$ then |
| 8:        Sound alarm |
| 9:    end if |
| 10: end procedure |

Anomaly Detection with Energy Meter

The detections provide the dictionary D from Algorithm 1. In order to only use the energy meter 103 in the detection to achieve fully outside monitoring of the devices 106, only the sub-dictionary of energy are extracted from D, denoted as $D_e$. Then instead of using energy meter 103 with collectD data to reconstruct the states, we only use the energy meter data for the optimization. The algorithm of constrained optimization with energy meter 103 is described as Algorithm 3.

| Algorithm 3 Dictionary Generation and Mapping with Energy Meter |
| --- |
| 1:    procedure DGME($S_e$, D) |
| 2:        Select $D_e$ from D |
| 3:        c = 1 |
| 4:        for q = 1 to length($D_e$) − 1 do |
| 5:            for p = q + 1 to length($D_e$) do |
| 6:                $D_{oe}(c) = D_e(p) + D_e(q)$ |
| 7:                c = c + 1 |
| 8:            end for |
| 9:        end for |
| 10:       $D_{oe} = [D_e; D_{oe}]$ |
| 11:       for j = 1 to length($S_e$) do |
| 12:           $x_{seq}(j) = \arg\min_i \|D_{oe}(i) - S_e(j)\|$ |
| 13:       end for |
| 14:       Recover the mapping x from $x_{seq}$ |
| 15:    end procedure |

And after detecting the anomalies, the normalized evaluation $\epsilon = \|\mathrm{svd}(\hat{P}(S\mid S')) - \mathrm{svd}(P)\|_2$ is used for multi-node cross-correlation for anomaly tracking.

Cross-Correlation Based Detection on Multi-Nodes

Figure 5:
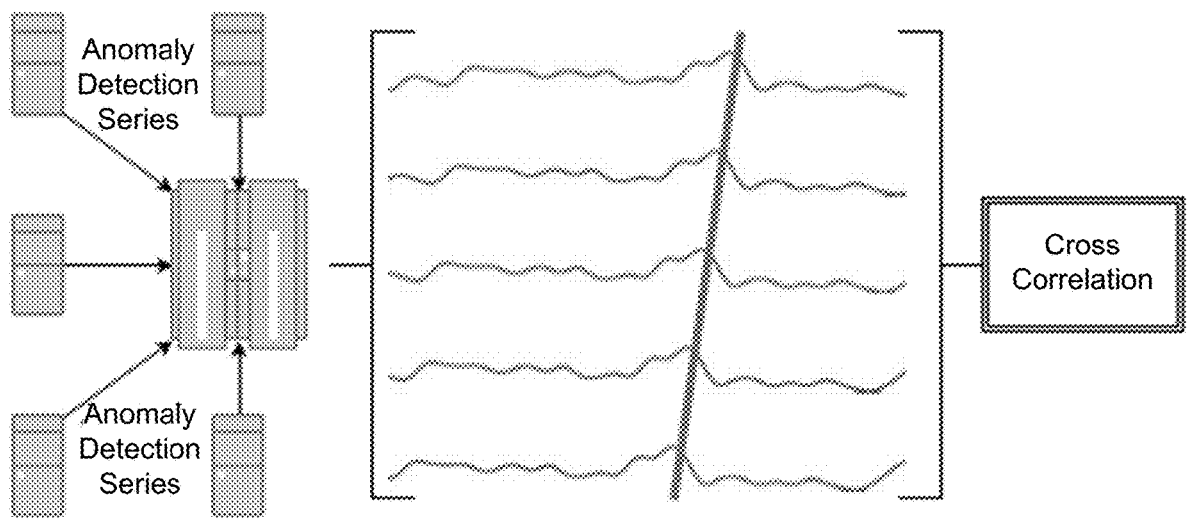
FIG. 5 illustrates this anomaly tracking framework for multi-node situations according to various embodiments of the present disclosure.

In multi-nodes situations, cross-correlation can be used to track the anomalies. Cross-correlation is a method to find the similarity of two time series data, and thus is often applied to find the time difference of events. For every single node, $\epsilon$ is calculated in a real-time way, and thus generates a time series, denoted as $\epsilon_n$, where n specifies the node number. The time series data can first be accumulated into a center node. The time difference can then be calculated by cross-correlation to determine the event arrival time sequence. The time sequence is then used to decide the anomaly pattern of the electrical device 106 or system of electrical devices 106. FIG. 5 illustrates this anomaly tracking framework for multi-node situations according to various embodiments. As shown in FIG. 5, every node sends the time series data from anomaly detection to the center node, and the center node gathers the data which has a time delay that every node starts the event. The center node then performs the cross correlation to determine the sequence of anomaly.

Cross-correlation is a method to calculate the relationship between two time series. The equation of cross-correlation is $$C(T_1, T_2)[n] = \sum_m T_1[m]T_2[m+n], \qquad (3)$$

where the cross-correlation result is denoted as C, and the time series are denoted as $T_1$ and $T_2$. m is the index of the convolution, and n is the lag of the cross-correlation. The result is a 1-dimensional array. The values are higher when the two series are similar to each other. This method is often used in earthquake arrival picking because it is more sensitive to the events that have sudden changes in the signal. Similarly, in this application, the anomaly detecting is also a kind of event that is suitable for cross-correlation.

In the framework of the present disclosure, the time series is gathered into the same processing node to achieve the cross-correlation. Each pair of nodes is finished with the cross-correlation, stored in a 3-dimensional array $C_N$, $C_N \in \mathbb{R}^{N \times N \times t}$ assuming that there are N nodes and every cross-correlation series has a length of t. The series is then processed with the arrival picking method to determine the delay time of each node, and to determine the anomaly occurring sequence of the multi-node system. The delay time is stored in a matrix $\Gamma$, where $$\Gamma = \begin{bmatrix} \gamma_{00} & \gamma_{01} & \cdots & \cdots & \gamma_{0N} \\ \gamma_{10} & \gamma_{11} & \cdots & \cdots & \gamma_{1N} \\ \vdots & \vdots & \ddots & & \vdots \\ \vdots & \vdots & & \ddots & \vdots \\ \gamma_{N0} & \gamma_{N1} & \cdots & \cdots & \gamma_{NN} \end{bmatrix}, \qquad (4)$$

The values on the diagonal of $\Gamma$ are 0 since they perform auto-correlation and since the anomaly is not set to periodical, the series achieve the highest correlation value on without any lag. The detailed algorithm is described as Algorithm 4.

| Algorithm 4 Anomaly Tracking |
| --- |
| 1:    procedure TRACKING |
| 2:        Gathering $T_n$ from nodes as T |
| 3:        for v in $T_n$ do |
| 4:            if v > θ then |
| 5:                v = 1 |
| 6:            else |
| 7:                v = 0 |
| 8:            end if |
| 9:        end for |
| 10:       for i from 0 to N do |
| 11:           for j from 0 to N do |
| 12:                $C_N[i, j, n] = \Sigma_m T_i[m]T_j[m+n]$ |
| 13:                $\Gamma[i, j] = \arg\max C_N[i, j]$ |
| 14:           end for |
| 15:       end for |
| 16:    end procedure |

Experiment

Synthetic Data Generation

The synthetic data set is constructed using Finite State Machine (FSM). Based on the behavior of IoT devices 106, the synthetic data is generated by using two matrices. The transition matrix describes the possibility of a certain state transit to another state, denoted as $P=[p(s_1), p(s_2), \ldots, p(s_N)]^T$, where $p_s[p_{s1}, p_{s2}, \ldots, p_{sN}]^T$ is the possibility of a state s transit to another state, and $\Sigma p_s = 1$. The length of each state hold is defined by a delay vector $t=[t_{s1}, t_{s2}, \ldots, t_{sN}]$. The device 106 can have M components including, for example, sensors, CPU, memory, disk I/O, RF module, etc., together with the energy meter data 109. Based on the transition matrix P, a sequence of states is constructed, and with the delay of each status, the synthetic signal $s \in \mathbb{R}^{M \times T}$ is constructed, where T is the length of the observed signal.

Figure 6:
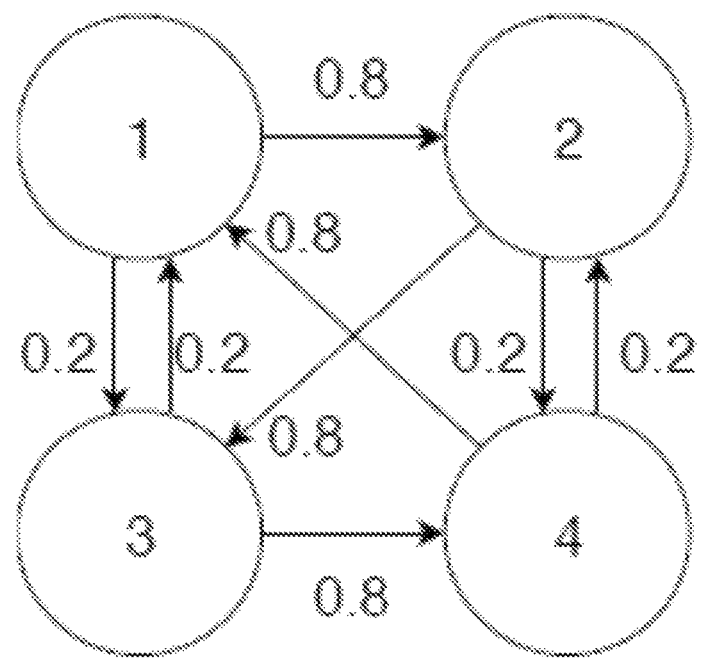
FIGS. 6 and 7 provide examples of Finite State Machin (FSM) models according to various embodiments of the present disclosure.
Figure 7:
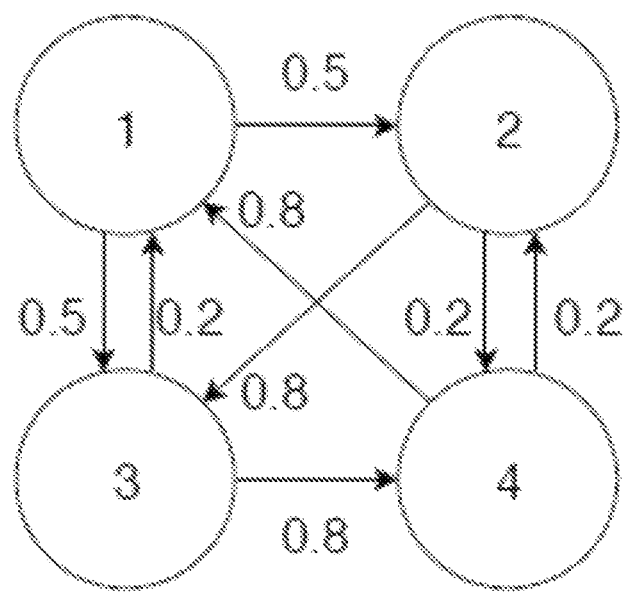

FIGS. 6 and 7 provide examples of FSM according to various embodiments of the present disclosure. In every state, the readings of components stay stable for a certain length of time, and in state transition period, the two neighboring states have a chance of overlapping together, due to the assumed low sampling rate of the sensors. In particular, FIG. 6 illustrates an example of the four states FSM model under normal system. FIG. 7 illustrates an example of the four states FSM model under the system that an anomaly is on the transition of State 1.

The FSM used in the experiment to generate the data 109 is composed of five states, with different values for the readings. The components used in this experiment are respectively sensor, CPU, radio, disk I/O, memory, and energy meter data. The experiments mainly focus on the relationship of data quality and the performance of the framework, while mainly consists of three sections. First, the anomaly detection rate in single node is compared with collectd data available situation. Next, the detection rate is compared with energy meter only, but the data with collectd is used as training set. Finally, the anomaly tracking performance of the framework is evaluated.

In the experiments, the data is generated with five states, and the duration matrix is set according to the assumed data size, and the normal IoT processing patterns. The five states are sensing, computing, broadcasting, receiving and storing, then another round of computing. Denoting the data size as b, the duration of each states are assumed as $$t_{sensing} = 3 \times b, \quad (5)$$

$$t_{computing1} = \frac{b^2}{2},$$

$$t_{broadcasting} = 7 \times b,$$

$$t_{receiving} = 5 \times b,$$

$$t_{computing2} = 4 \times b,$$

and the consumption matrix is set as $$C_{com} = \begin{bmatrix} 1.5 & 0.0 & 0.0 & 0.0 & 0.0 \\ 5.0 & 7.0 & 5.5 & 5.0 & 6.0 \\ 3.0 & 3.0 & 6.5 & 6.0 & 2.0 \\ 1.5 & 2.0 & 1.5 & 3.0 & 2.0 \\ 1.5 & 2.0 & 1.5 & 0.5 & 1.0 \end{bmatrix}, \quad (6)$$

where the each row represents a certain component, and each column is the states value. Since the energy data is supposed to be the sum of the components, the energy meter reading can be assumed as the sum of the components for the states. In each state, the state stays in the length of durations, and in transition, the states transit to another one according to the transition matrix. The anomaly can be assumed from the transition matrix that because of some unknown reason, the transition possibility for some states are changed and thus the system is faulty. The normal state transition matrix and the faulty transition matrix used in the experiments are respectively $$P_{true} = \begin{bmatrix} 0.0 & 0.8 & 0.2 & 0.0 & 0.0 \\ 0.0 & 0.0 & 0.8 & 0.2 & 0.0 \\ 0.0 & 0.0 & 0.0 & 0.8 & 0.2 \\ 0.2 & 0.0 & 0.0 & 0.0 & 0.8 \\ 0.8 & 0.2 & 0.0 & 0.0 & 0.0 \end{bmatrix}, \quad (7)$$

$$P_{faulty} = \begin{bmatrix} 0.0 & 0.8 & 0.2 & 0.0 & 0.0 \\ 0.0 & 0.0 & 0.8 & 0.2 & 0.0 \\ 0.0 & 0.0 & 0.0 & 0.8 & 0.2 \\ 0.2 & 0.0 & 0.0 & 0.0 & 0.8 \\ 0.8 & 0.2 & 0.0 & 0.0 & 0.0 \end{bmatrix}, \quad (8)$$

The experiments are designed to determine if the signal is in accordance to the true transition matrix.

Anomaly Detection with Energy Meter and Collectd Data

Figure 8:
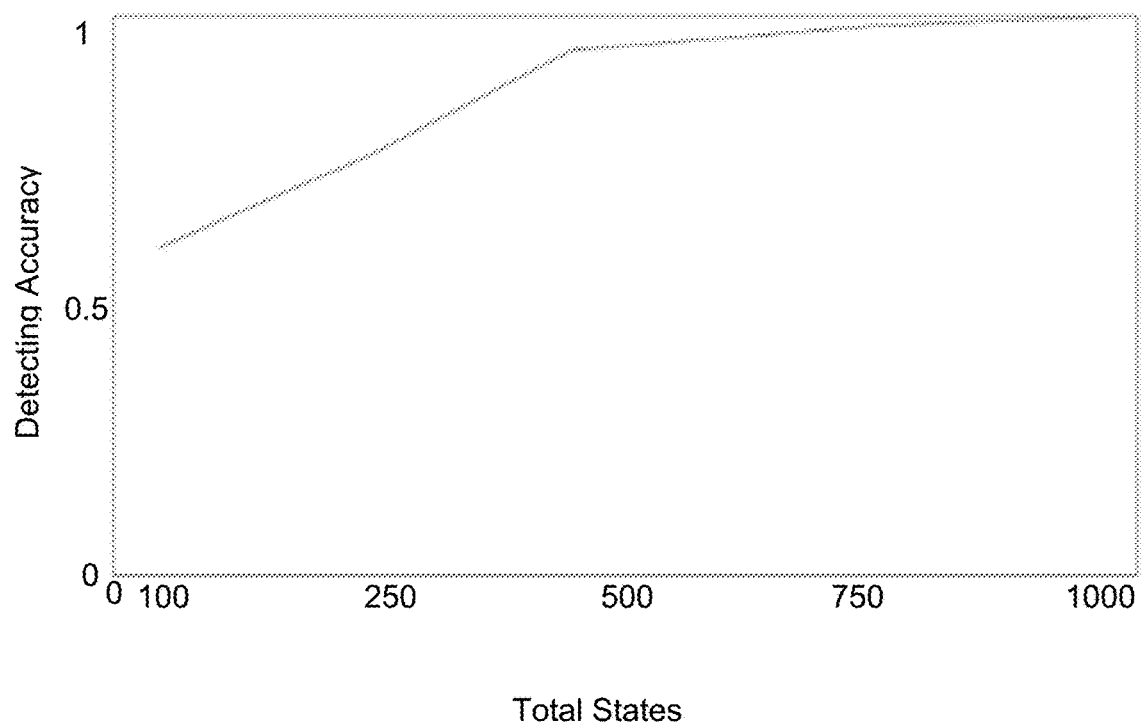
FIG. 8 illustrates an example of a graphical representation showing testing accuracy with different state numbers in data according to various embodiments of the present disclosure.

In the experiments, the performance of the algorithm is tested with the change of noise strength and total state numbers. First, the influence of total state numbers can be compared. The noise standard deviation is set to 0.1, and tested on the time sequences of 100, 300, 500, 800, 1000 states in the sequences. The transition matrix is reconstructed and then compared with the original transition matrix to determine whether the sequences are from a good FSM or a faulty FSM. The threshold for the differences is set to 0.1. FIG. 8 illustrates an example graphical representation of the result according to various embodiments. In particular, FIG. 8 illustrates testing accuracy with different state numbers in data.

As shown in FIG. 8, the more states in the time sequence, the better accuracy the algorithm achieves. This is mainly because of the nature of the Bayesian inference that requires a large number of observations. The probability based method performs well especially in the situation that each time sequence is composed of 1000 states, with a testing accuracy of 99.7%. As the testing states decreases to 100, the accuracy drops to 58.5%. Other than the accuracy, the processing time is different through the total states. In 1000 total states, the processing time of the data is significantly longer than 100 states. Although the total states is the time window length in actual applications and is not hard to adjust, the processing overhead could be one possible issue if the length is too long.

In another experiment, the performance with different noise strength is compared. In the data generation period, zero mean Gaussian noise is added to the energy meter reading data. The strength of the noise is indicated by the standard deviation. In the experiments, the total states are set to 500, and the noise STD of 0.01, 0.05, 0.1, 0.15, 0.2 were tested. In the comparison to the original transition matrix, the accuracy stays stable, as shown in FIG. 9 which illustrates a graphical representation of testing accuracy with different noise strength in data.

Figure 9:
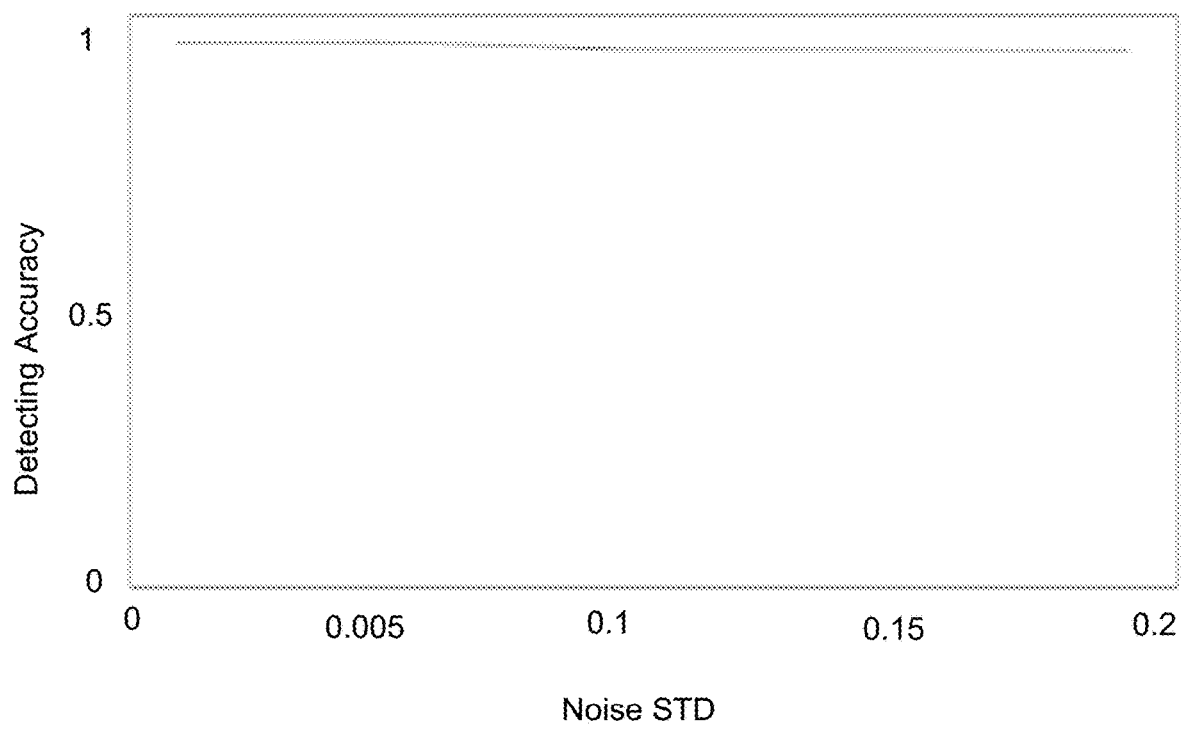
FIG. 9 illustrates an example graphical representation showing that the testing accuracy keeps high through the specified noise strengths according to various embodiments of the present disclosure.

FIG. 9 shows that the testing accuracy keeps high through the specified noise strengths. The highest accuracy is 95.2% achieved in 0.05 noise standard deviation (STD). But as the noise becomes stronger to 0.2, the accuracy stays at the level of 93%, and in 0.2 noise STD, the accuracy is 93.7%. There is a slight drop of the accuracy, but the algorithm keeps a good general performance in this experiment. With the collectd data, the algorithm works well in the synthetic data. It successfully separates the overlapped states, and detects the anomalies with a satisfactory accuracy. In the real applications, the actual signal would have more noise, but with the algorithm of the present disclosure, within an acceptable signal to noise ratio, the anomaly detection problem is provided a solution. The next experiments are situations were the collectd data forms the dictionary, but is not used for testing.

Anomaly Detection with Energy Meter Data Only

In the next examples, only the energy meter data 109 is used for testing. Since the dataset is smaller than the dataset with collectd, the processing time is much less than the algorithm using collected data. In the first experiment, the accuracy and total state numbers are tested first and then the different noise strength is tested. In the first experiment, the noise strength is set as 0.05 since the information is less than the previous experiment, and is compared to the test accuracy with the data of 100, 300, 500, 800, 1000 total states. FIG. 9 illustrates an example graphical representation of the testing accuracy with different state numbers in data and shows the result of the first experiment.

Figure 10:
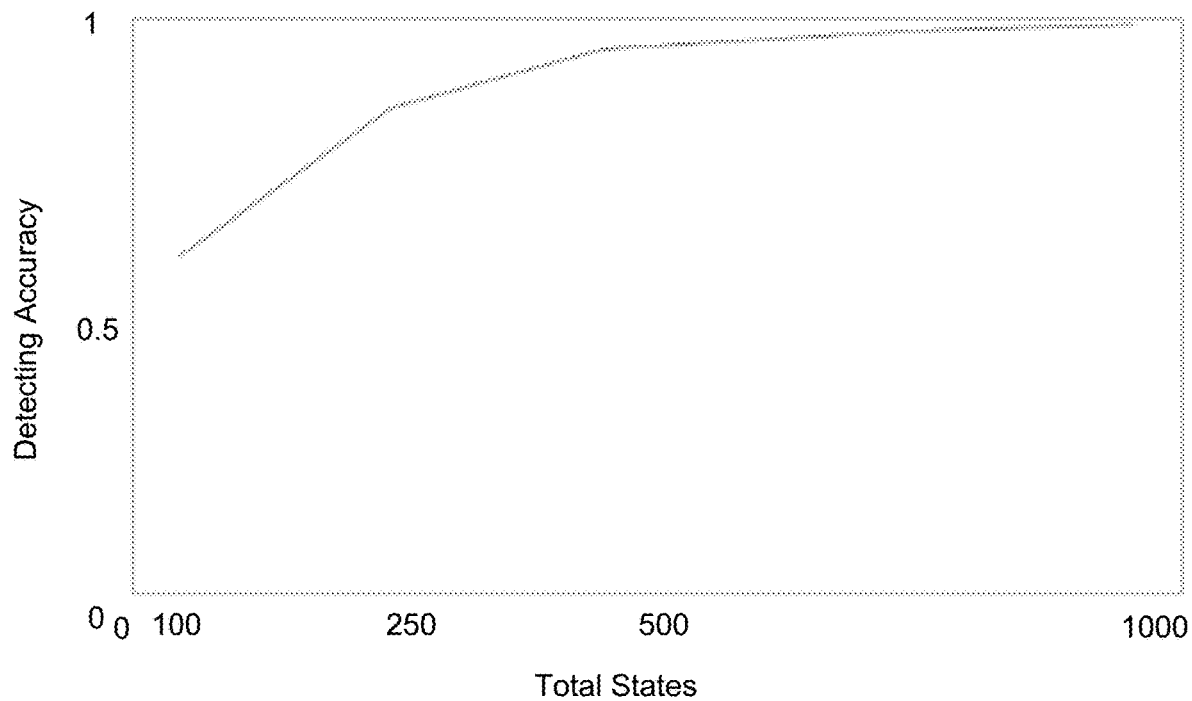
FIG. 10 illustrates an example graphical representation of the testing accuracy with different state numbers in data and shows the result of the first experiment according to various embodiments of the present disclosure.
Figure 11:
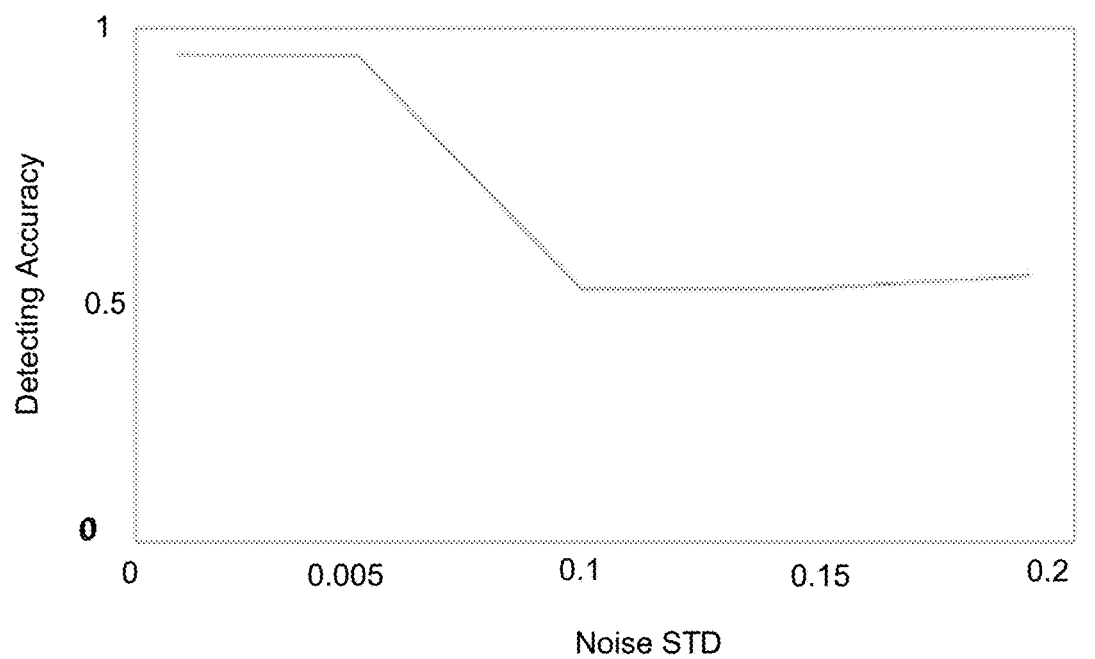
FIG. 11 is an example of a graphical representation showing the testing accuracy with different noise strength in data according to various embodiments of the present disclosure.

FIG. 10 shows that as the total states grow from 100 to 1000, the accuracy also grows. The accuracy grows from 58.7% to 98.9%. But the rate of growing is getting slower as more states are used in the dataset. Longer processing time will be used when the dataset is big. Comparing with the dataset with collectd data, the testing accuracy drops a bit. Then, the different noise strength is tested and the dataset with a total state number of 500 is used in this experiment, and test through the noise standard deviation of 0.01, 0.05, 0.1, 0.15, 0.2. The settings are the same as the dataset with collectd data to compare the experiment results. FIG. 11 shows the result of the experiment by providing an example graphical representation of the testing accuracy with different noise strength in data.

The result shows that with a limited noise strength, the accuracy is still acceptable which is around 95%, but with a bit more noise, the accuracy drops quickly and keeps stable at around 50%. Comparing with the experiment with collectd data present, this result shows that with only energy meter data 109, the result of this framework is affected by the limited information given. This shows that if the energy data 109 can be secured from outside the system, the precision of the energy meter 103 is important for this framework. With the previous experiments, the framework works for the single node anomaly detection task. However, the trace of the anomaly path is needed to understand the possible anomaly reason. In the multi-node situation, an algorithm is included for detecting the sequence of anomaly in order to know more about the anomaly. Experiments will be introduced in the next section.

Anomaly Tracking

In anomaly tracking task, the data is gathered into a center node to perform cross-correlation. The setting of each node is that the total state number is 500, with the noise STD 0.1. In the experiments, the series can be wrongly detecting the anomaly, and the value of some points can be much higher than the normal detection value. Pre-processing the data can make the detection more accurate. First, the nodes with the anomaly are tested one by one, according to the node index. Each node performs 110 times of anomaly detection, and then forms into a sequence. The delay of every node is ten (10) sampling points, and the anomaly is with a duration of five (5) sampling points. The cross correlation result is shown in FIG. 12 which illustrates an example of tracking the anomaly in multi-nodes situation, positive numbers are the column nodes detect anomaly earlier, while negative numbers are the column nodes detect anomaly later.

Figure 12:
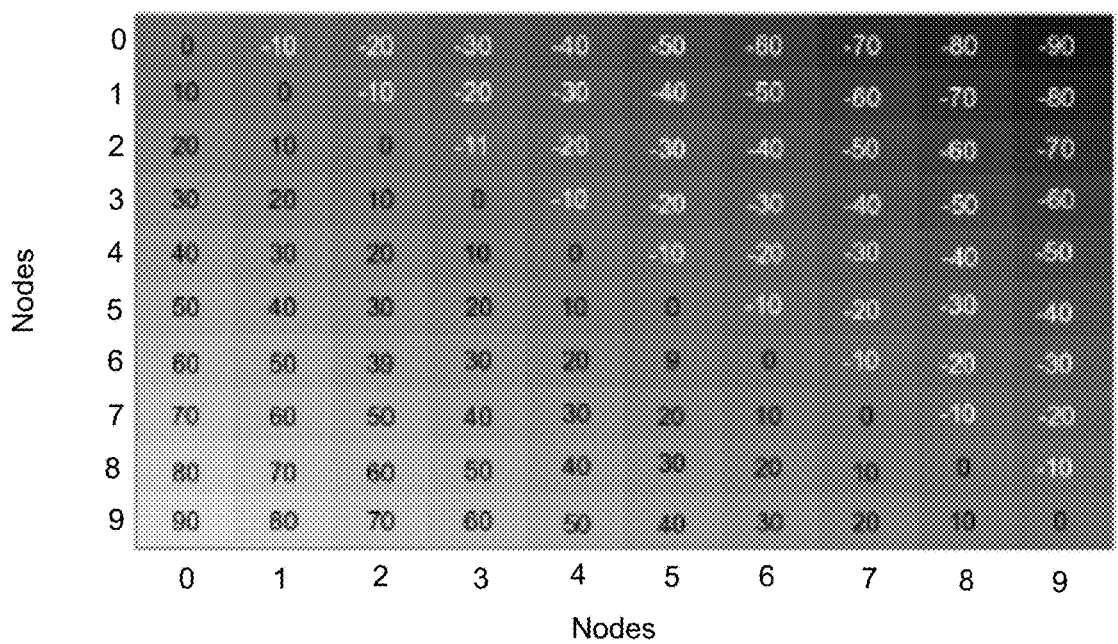
FIG. 12 illustrates an example table tracking the anomaly in multi-nodes situation according to various embodiments of the present disclosure.
Figure 13:
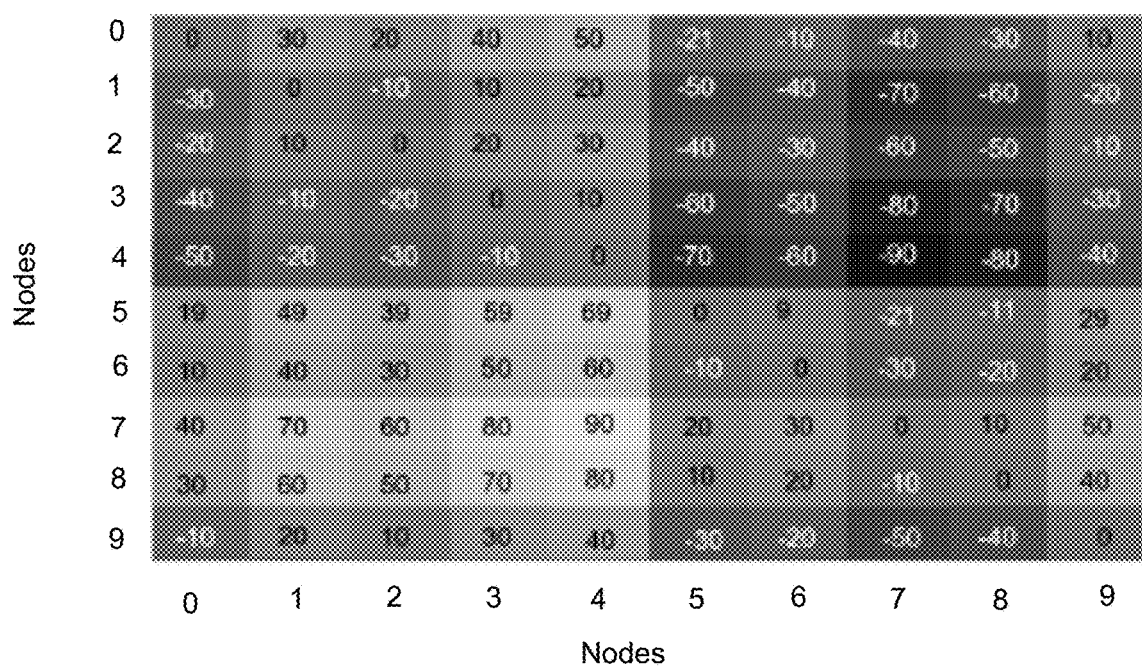
FIG. 13 illustrates an example table tracking the anomaly in multi-nodes situation where the sequence is not related with the indexes of the nodes various embodiments of the present disclosure.

The result of the cross-correlation from FIG. 12 shows that the tracking algorithm works well. The setting is that the anomalies occur in the nodes with the same sequence of the indexes of the nodes, and the interval of every anomaly is ten (10) sampling points. This result shows that the detection of the sequence of anomaly occurrence is correct, and the interval is correct for most nodes, except in some nodes (node 5 and 6), the interval is off the true value. The situation that the sequence is not related with the indexes of the nodes is then tested. The true sequence used is randomly generated, and it is 5, 2, 3, 1, 0, 7, 6, 9, 8, 4. The other settings are the same as the previous experiment as shown in FIG. 13 which illustrates tracking the anomaly in multi-nodes situation where the sequence is not related with the indexes of the nodes.

Figure 14:
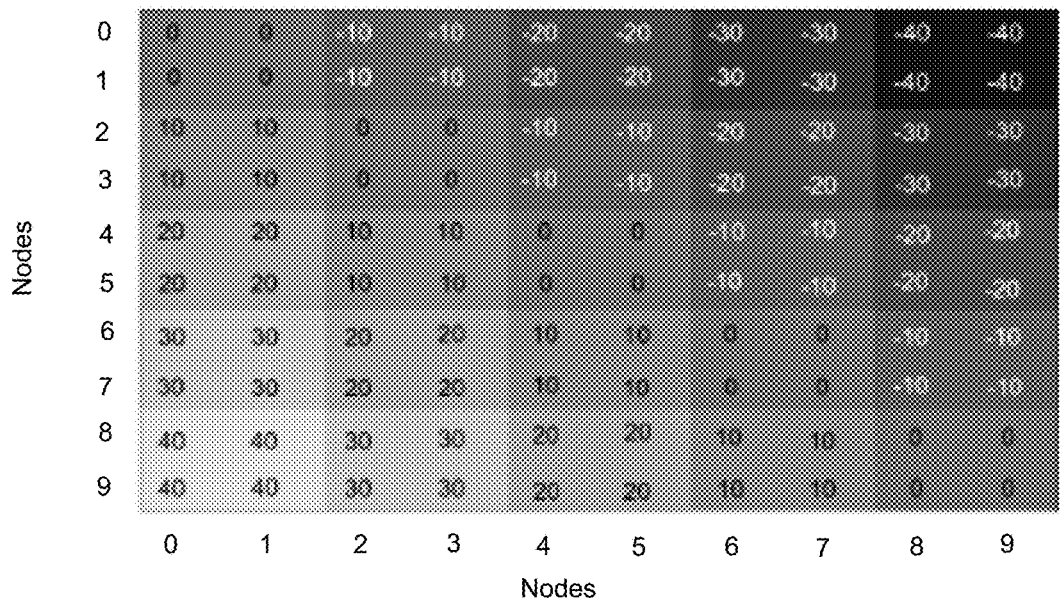
FIG. 14 illustrates an example of tracking the anomaly in multi-nodes situation, where two anomalies happen at the same time in different nodes, and also without collectd data according to various embodiments of the present disclosure.

From this figure we can see that the result keeps stable when the sequences are random. It exactly shows the sequence that indicated in the experiment setting. The next experiment is that the situation when the anomalies happen at the same time in some nodes, since in some cases, some critical parts may break down at the same time. The sequence used is that for two neighboring nodes, the anomaly happens at the same time, and other settings are the same as the first experiment in this section as shown in FIG. 14 which illustrates tracking the anomaly in multi-nodes situation, where two anomalies happen at the same time in different nodes, and also without collectd data.

This result shows that in the situation when two anomalies happen at the same time in different nodes, the algorithm is able to track that the simultaneous events accurately. Finally, the situation that only energy data 109 is used is tested. To make the comparison fair, the noise STD 0.05 is used in this experiment. Other settings are the same as the previous experiment. The result from this experiment is exactly the same as the previous experiment shown in FIG. 14. This shows that this framework is able to work with the algorithm for the situation that only energy data 109 could be trusted.

According to various embodiments, a framework is disclosed that can detect and identify system anomalies in IoT devices 106 and the anomalies can be tracked in a multi-mode system. In the single node anomaly detection part, a novel coding algorithm is provided for the pattern match for dictionaries, specifically for the energy data in IoT devices which usually performs certain tasks without a lot of manual change. In the anomaly tracking part, an algorithm is introduced to track the anomaly spreading sequence in a multi-node system using cross-correlation method. Although the synthetic data can be used in some implementations and there are some existing assumptions for this set up of the algorithms, energy meters can still be used for non-intrusive anomaly detection, especially when the kernel reported data such as collectd cannot be trusted. The experiment results supports that the present disclosure achieves a good detection rate under some noise range, and given enough data. It also shows that the tracking algorithm is able to track the anomaly happening sequence to possibly get more information of the reason behind the anomalies.

Anomaly Detection Based on Power Consumption Measurement

Assume that the exact state numbers in the observed data is not known. To figure out the total state number, the Kneedle algorithm can be applied to determine the best dictionary value in the clustering. k-means on the non-overlapped data $S_{dict}$ can be used to get the centroid of each cluster C as the dictionary $D=[d_1, d_2, \ldots, d_k]$, $D \in \mathbb{R}^{M \times K}$. The dictionary D can be combined into the combinations of all possible two dictionaries sum up and concatenated into the original Dictionary D, denoted as $D_0$. Then the mapping is performed on the observed data. The optimization problem is represented by Equation 1.

To solve the optimization problem, since the dictionary D is defined, and the mapping $x \in \mathbb{Z}^{K \times T}$, all possible combinations of the mappings can be reviewed, and the l2-norm can be minimized to get the estimated mappings. According to various embodiments, the FSM graph can be reconstructed to see the transition matrix to determine whether there is an anomaly or not. In some implementations, the Bayesian inference can be used to reconstruct the transition matrix. According to various implementations, the frequency of every state can be counted in the reconstructed sequence, denoted as $\hat{P}(S') = [p(s_1), p(s_2), \ldots, p(s_N)]$ and the frequency of every state after another can be counted, denoted as $\hat{P}(S,S') = [p(s, s_1), p(s, s_2), \ldots, p(s, s_N)]^T$. The observed transition matrix is represented in Equation 2.

The singular value decomposition (SVD) can then be used to get the eigenvalue of the reconstructed matrix to compare with the true transition matrix. A threshold $\theta$ is, and when $\|svd(\hat{P}(S|S')) - svd(P)\|_2 > \theta$, the current observation can be labeled as an anomalous one.

Another approach is based on data-driven machine learning. Deep learning method can be developed to learn the (non-linear) relationship between the individual element performance metrics and total power consumption. The individual performance metrics, such as CPU usage, transmitted and received network packets and disk usage patterns of fixed time duration, can be gathered with CollectD. Then the disaggregation model can be trained to learn the relation between the power consumption and performance metrics. This can be considered as a single channel blind source separation problem. Modern approaches for power disaggregation use various techniques and algorithms like sparse coding, factorial hidden Markov models and neural networks.

Use the pre-trained disaggregation model to decompose the power consumption to system metrics. Along with the energy meter readings, the system statistics collected by Collectd is also collected. Use the disaggregation results to compare with the true CollectD data to detect the cyber-attacks using an adaptive statistics based thresholding method. The analyzing device will first be trained with the correct FSM transitioning graphs. After the new batches of data arrive, it will reconstruct the transitioning graph and compare with the trained one to determine whether the system is in an abnormal situation. Once trained with the dictionaries, a method is proposed that only using the energy meter data to detect system anomalies for the node.

After the single node anomaly detection, our framework is also able to perform the tracing of the possible anomaly spreading route and source. To do that, the energy profile map of the IoT system as a whole can be used. Energy profile map analysis of the whole system is also a necessary approach to detect the zero day attacks, where a few nodes are compromised while the rest nodes are not. The energy usage map of the whole IoT system can be classified and processed to identify the anomaly. Texture feature analysis can be applied to extract the spatial information of the energy usage of the IoT system as a whole. Then, the temporal information of the extracted texture features can be analyzed in time series. The spatial and temporal features of energy profile map measure the health of the CPS network. At last, a supervised learning method, k-NN classification, can used to classify and recognize the energy usage patterns.

Anomaly Detection Based on Electrical Waveforms

Many electrical appliances (washer, dryer, washing machine, dryer, air conditioner, refrigerator, dishwasher) are powered by power electronics converters, which are non-linear loads and will bring significant harmonics to home/building/factory power systems. As electric appliance market grows, harmonic distortion has been an increasing concern and will potentially have various damaging impacts in power systems including overheating transformers and equipment, overloading the neutral conductors, and nuisance tripping of circuit breakers. Many efforts have been made to limit harmonics to the certain level even when there is no failure or attack. In recent years, due to increased convenience and energy saving, smart appliances have entered mainstream markets, and power electronics converters used in electrical appliances are now being connected to the internet. Therefore, power electronics converters are vulnerable to cyber-attack in addition to physical attack/failure. This further poses greater challenges on anomaly detection of electrical appliances. Much work has been done to detect failure and degradation of components (voltage sensors, current sensors, power semiconductor devices, capacitors) in power electronics converters, however, there does not appear to be any known techniques for detecting the anomaly of power electronics converters used in electrical appliances, which might be due to cyber-attack, physical attack or failure or degradation. The attacker might attack the home/factory/building power systems by intentionally controlling power electronics systems to produce the undesirable harmonics. In addition, the harmonics of electrical appliances can be affected not only by cyber/physical attacks and failure dedicated to power electronics, but also power system level attacks and faults including transmission lines faults. In addition, the adoption of converter and inverter-interfaced distributed power electronics makes traditional fault detection schemes inappropriate due to their dependence on significant fault currents. But those faults will be captured in electrical waveforms.

Figure 15:
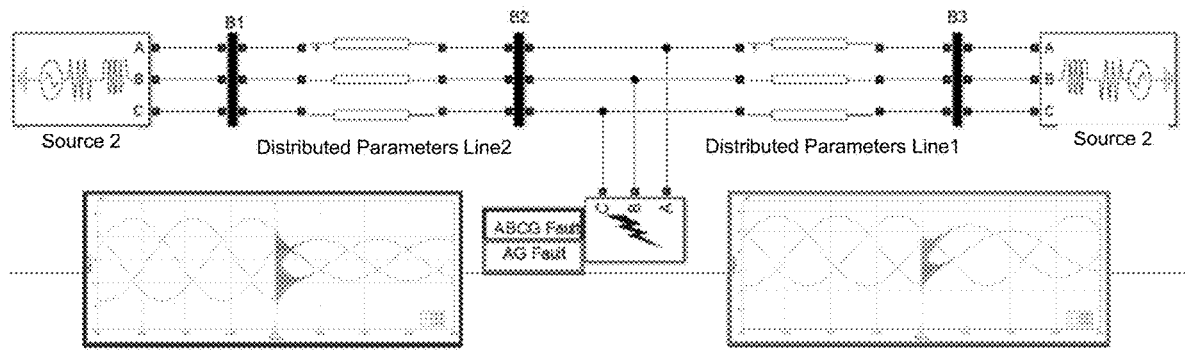
FIG. 15 illustrates an example of a simulation of ABCG and AG faults on the power line according to various embodiments of the present disclosure.

Thereafter, various embodiments of the present disclosure relate to locating attack/fault source in home/building/factory, using the voltage and current waveform data from strategic locations. In this task, an intelligent anomaly detection scheme is introduced based on electrical system physical modeling and machine learning, with the goal of providing fast fault type, phase, and location information for protection and service recovery. FIG. 15 illustrates an example of a simulation of ABCG and AG faults on the power line. In particular, FIG. 15 shows two typical fault types and corresponding waveforms of the three phases. Those meter measurements inherently have two aspects: spectral components and time varying features. The discrete wavelet transform kind methods, such as multi resolution mode decomposition and intrinsic mode decomposition methods, can be used to extract features. Then, the raw input data combining with the features can be fed into a deep neural network to extract dynamic and spatial features without the expected knowledge.

Applying Neural networks to extract features derived from the raw sensor signals often leads to higher performance. Convolutional networks (CNNs) have been suggested to address the lack of expert knowledge. A CNN with a single layer extracts features from the input signal through a convolution operation of the signal with a filter (or kernel). In a CNN, the activation of a unit represents the result of the convolution of the kernel with the input signal. By computing the activation of a unit on different regions of the same input (using a convolutional operation), it is possible to detect patterns captured by the kernels, regardless of where the pattern occurs. In CNNs, the kernels are optimized as part of the supervised training process, in an attempt to maximize the activation level of kernels for subsets of classes. A feature map is an array of units (or layer) whose units share the same parameterization (weight vector and bias). Their activation 4 yields the result of the convolution of the kernel across the entire input data. The application of the convolution operator depends on the input dimensionality. With a temporal sequence of 2D images (e.g., a video), often 2D kernels are used in a 2D spatial convolution. With a one-dimensional temporal sequence (e.g., a sensor signal), often a 1D kernel is used in a temporal convolution. In the 1D domain, a kernel can be viewed as a filter, capable of removing outliers, filtering the data or acting as a feature detector, defined to respond maximally to specific temporal sequences within the timespan of the kernel. Formally, extracting a feature map using a one-dimensional convolution operation is given by:

$$a_j^{(l+1)}(\tau) = \sigma\left(b_j^l + \sum_{f=1}^{F^l} K_{jf}^l(\tau) * a_f^l(\tau)\right) \qquad (9)$$
$$= \sigma\left(b_j^l + \sum_{f=1}^{F^l}\left[\sum_{p=1}^{P^l} K_{jf}^l(\tau) a_f^l(\tau - p)\right]\right).$$

where $a_j^l(\tau)$ denotes the feature map j in layer l, $\sigma$ is a non-linear function, $F^l$ is the number of feature maps in layer l, $K_{jf}^l$ is the kernel convolved over feature map f in layer l to create the feature map j in layer (l+1), $P^l$ is the length of kernels in layer l and $b^l$ is a bias vector. After getting the temporal and spatial features, modified data can be fed into a recurrent neural network (RNN) to extract the sequential features. A deep learning model can be built for the attack/fault detection. Based on the historic energy usage or current/voltage records, a time series data model can be built through RNN (LSTM) or classic linear/non-linear regression models.

An LSTM has a special neuron structure called memory cell. These memory cells have the ability to carry information over an arbitrary time. The input, output and forget gate together control the information ow into and out of the neurons memory cell.

Given a temporal input sequence $a^l=(a_1^l, \ldots, a_T^l)$ of length T (being at the activation of the unit i in hidden layer l at time t), an RNN maps it to a sequence of hidden values $h^l=(h_1^l, \ldots, h_T^l)$ and outputs a sequence of activations $a^{l+1}=(a_1^{l+1}, \ldots a_T^{l+1})$ by iterating the following recursive equation:

$$h_t^l = \sigma(W_{xh}^l a_t^l + h_{t-1}^l W_{hh}^l + b_T^l) \qquad (10)$$

where $\sigma$ is the non-linear activation function, $b_T^l$ is the hidden bias vector and W terms denote weight matrices, $W_{xh}^l$ being the input-hidden weight matrix and $W_{hh}^l$ the hidden-hidden weight matrix. The activation for these recurrent units is defined by:

$$a^{(l+1)} = h_t^l W_{ha}^l + b_a^l \qquad (11)$$

where $W_{ha}^l$ denotes the hidden-activation weight matrix and the $b_a^l$ terms denote the activation bias vector.

LSTMs extend RNN with memory cells, instead of recurrent units, to store and output information, easing the learning of temporal relationships on long time scales. LSTMs make use of the concept of gating: a mechanism based on component-wise multiplication of the input, which defines the behavior of each individual memory cell. The LSTM updates its cell state, according to the activation of the gates. The input provided to an LSTM is fed into different gates that control which operation is performed on the cell memory: write (input gate), read (output gate) or reset (forget gate).

When the prediction error is too large, an attack/fault is detected. According to various embodiments, two approaches can be available. The first approach is based on the linear/non-linear regression model. The errors at every node can be calculated, and when the node is closer to the attack/fault location, the error should be larger, and a rough location can be obtained. The second approach is based on the trained all possible fault locations where all the possible combinations of different parameters can be simulated. Then a classification model can be learned to classify the anomaly to the most possible location.

Anomaly Detection in Electrical Waveforms of Power Networks

If cyber networks are viewed as the nervous system of infrastructures, then energy networks can be said as the circulatory system of infrastructures. Today, almost everything (such as home appliances, industrial machines, data centers and electrified transportation) is connected with energy networks and draws energy from it. To date, much attention has been paid to data and information in cyber networks, but little attention has been paid to the information embedded in raw electrical waveforms and signals in energy networks. The meter and PMU data used by power engineering are basically a summary of raw waveform data in a time period. There are much more to be explored from raw electrical waveforms and signals of energy networks. For example, all devices 106 in power networks 108 must leave traces of their operation status and health (including faults or attacks) information in the raw electrical waveforms and signals: a cyber-device in fault or under attack will cause unusual energy consumption pattern in power networks 108; a power electronics or electric machine in fault or under attack may cause unusual harmonics or energy profile in power networks 108. Also, the weather or geomagnetic events may also leave a trace in those raw waveform data. Therefore, the electrical waveform and signals can be used to (1) enable fault monitoring, diagnosis and prognosis of power electronics and electric machines; and (2) enable detection, identification and defense of cyber and physical attacks in both cyber and physical world.

Figure 16:
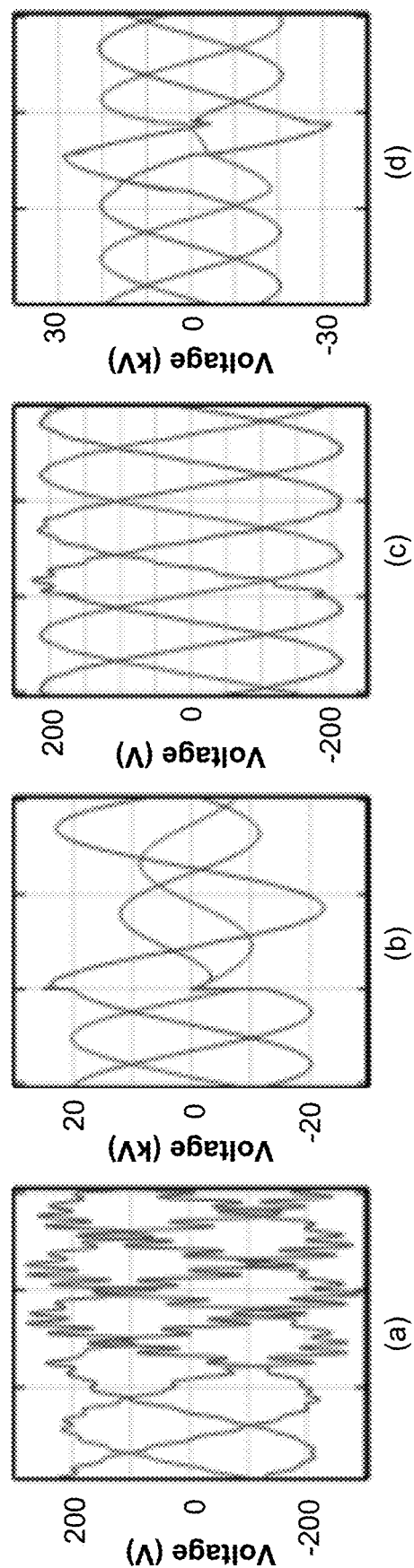
FIG. 16 illustrates example graphical representations of the monitored electrical waveform data from a power network obtained from electrical waveform auditing devices according to various embodiments of the present disclosure.

Some cyber or physical threats may be not a security problem at individual device, but result in negative impact on the power networks 108. For example, a firmware/software upgrade to an electrical device can cause power quality degradation problems in a distribution network for several months until it is discovered. This problem is not an attack, but is a real threat to the power network 108 and can affect hundred and thousands customers. FIG. 16 illustrates example graphical representations of the monitored electrical waveform data from a power network obtained from electrical waveform auditing devices (e.g. energy waveform sensors). In particular, FIG. 16 illustrates power quality disturbances due to physical or cyber threats. For example, FIG. 16 (a) illustrates increased harmonics by malicious or improper inverter control settings FIG. 16 (b) illustrates unbalanced voltage by transformer short circuit faults, FIG. 16 (c) illustrates oscillatory transient by adding the capacitor banks, and FIG. 16 (d) illustrates increased harmonics due to load reduction. According to various embodiments, power quality waveform data obtained from strategically placed energy waveform sensors in the power network 108 can be used for threat monitoring and diagnosis.

The systems and methods of the present disclosure information from different sources to improve power network observability, security, and reliability. The machine learning formulation proposed in this disclosure for multiple time series is intuitively the nonparametric regression in the statistical learning theory. Traditional time series analysis or machine learning methods ignore some unique characteristics of the multi-stream measurement data, in particular, the coexistence of strong temporal correlation and inter-stream relatedness. The anomaly detection with multiple coevolving time series data to capture both the temporal dependence and the inter-series relatedness is proposed. The anomaly identification and classification are modeled to classify the observed data x into "trend" functions u and anomalies f based on the "normal" behavior data and simulated "faulty" data. Once the trend and fault libraries are built, the monitoring system detects anomalies when the fitting error is larger than the threshold. In addition, the fault types can also be determined simultaneously based on the following equation:

$$\min_{u_1,\ldots u_K, f_1,\ldots f_Q} \sum_{m=1}^{M}\sum_{t=1}^{T}(x_{mt}-Y)^2 + \lambda_1 \sum_{m=1}^{M}\sum_{t=2}^{T-2}[\nabla_t^2 Y]^2 + \quad (12)$$

$$\lambda_2 \sum_{i=1}^{M}\sum_{j=1, j\neq i}^{M}\sum_{t=2}^{T-1}[\nabla_t^2(Y-C_{ij}Y)]^2 \text{ where, } Y=F(u_{mt})+G(f_{mt})$$

here $x_{mt}$ represents the tth observation in the mth time series, $u_m$, is the corresponding "trend component", then $F(u_{mt})$ is the combination of $u_{mt}$ at the certain time point, while $f_{mt}$ denotes the possible faults, and $G(f_{mt})$ is the combination of faults as we assume it is possible to have multiple faults happening simultaneously, $\nabla_t^2$ denotes the second-order difference operator, the weighting parameter $\lambda$ is a smoothness parameter, and $C_{ij}$ is the correlation operator.

Since the core learning problem dealing with multiple time series has been formulated into a convex optimization problem, it is tempting to directly solve it with the stochastic gradient descent (SGD) method, which is widely used in big data mining applications, can be adopted. Affected by cyber or physical threats, the measured signals are generally transient and dynamic under the concerned time section. Time-frequency analysis can identify the signal frequency components and reveal their time-variant features, which has been an effective tool for monitoring and anomaly diagnosis by extracting feature information contained in nonstationary signals. When a 1D time series signal is represented in a time-frequency domain, it can be regarded as a continuous 2D image. The dynamic time warping (DTW) operation in the frequency domain uses an affine dilation on the time axis of the time-frequency representation.

The root cause diagnosis can be formulated as the following objective function:

$$\sum_{m=1}^{M}\sum_{t=1}^{T}[x_{mt}-Y]^2 + \zeta_1 \sum_{m=1}^{M}\|Y\|_q + \zeta_2 \sum_{t=1}^{T}p(Y) \quad (13)$$

In this expression, the first term specifies the predictive error of the observed data and disaggregated trend and fault components, the second term promote the sparsity of Y using $l_q$ norm. In the third term, the function p(Y: is designed to penalize the change from different trends and faults and $\zeta$ is the weighting function. Once the objective function is solved, (1) the power network status that each time point t belongs to which trend or possible fault can be obtained, and (2) the sparsity or rank of the observation can be obtained. In embodiments, where there are only limited sensors in the network, sparsity constraint results can be used to determine the number of waveform sensors.

Figure 17:
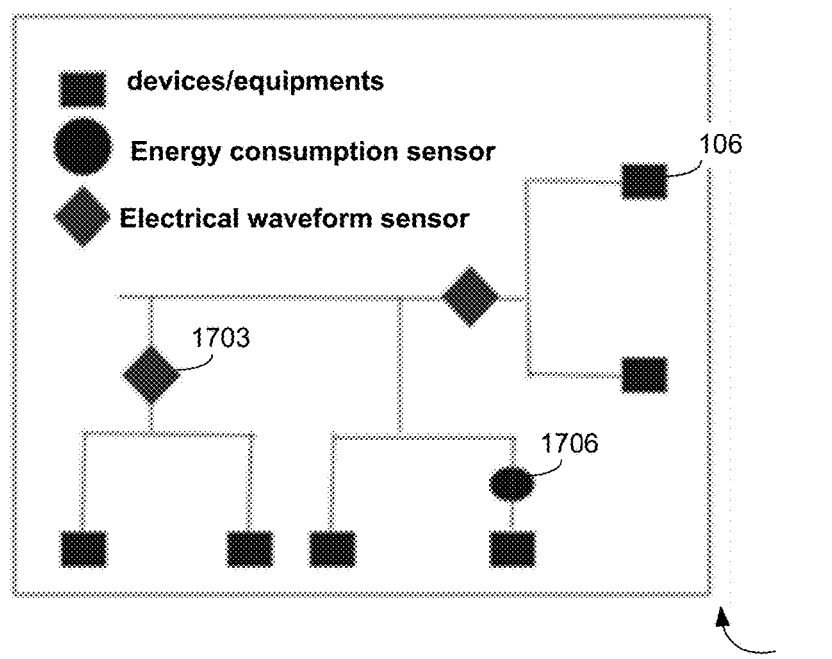
FIG. 17 illustrates an example diagram of a power network comprising multiple cyber devices and/or electrical equipment according to various embodiments of the present disclosure.

FIG. 17 corresponds to an example diagram of a power network 108 comprising multiple electrical devices 106 and/or electrical components. As shown in FIG. 17, one or more energy waveform auditing devices 1703 (e.g. energy waveform sensors) or other types of sensors can be coupled to the power network to monitor electrical waveforms (or power quality data) in a power network. In some embodiments, as shown in FIG. 17 and as discussed above, an energy consumption sensor 1706 can be coupled to a particular cyber device 106 to monitor energy consumption data 109 associated with the particular device 106. The power network can comprise an electrical vehicle power network, a home power network, a building power network, a manufacturing system power network, a microgrid, a power distribution network, a power transmission network, or a power generating network, and/or other type of power network.

According to various embodiments, the energy waveform sensor 1703 is configured to monitor the electrical waveforms in a power network. By comparing the monitored data with learned data and/or other types of historical data, anomalies in the power network can be detected. Using the learned data and/or other types of historical data, a detected anomaly can be classified based on one or more characteristics in the electrical waveforms monitored. According to various embodiments, a type of anomaly can be determined based on the classification. For example, the type of anomaly can include a physical threat, a cyber threat, and/or not a threat.

In some embodiments, the electrical waveform auditing device 1703 comprises a processor configured analyze and diagnose the anomalies of the electrical devices and/or equipment in a power network. In other embodiments, the electrical waveform auditing device 1703 is configured to obtain electrical waveform data from the power network and transmit the electrical waveform data to a remote computing device 112 that is configured to analyze and diagnose the anomalies in the power network.

Example 2

A hierarchical signal processing methodology is disclosed for generator condition monitoring and fault diagnosis based on raw electrical waveform data in power networks, which can often be measured by strategically located waveform sensors. The impact of generator short circuit faults on strategically located electrical waveform sensors in power networks are firstly investigated and validated in Matlab Simulink. Based on the large set of electrical waveform data produced by Matlab Simulink, a hierarchical algorithm is then designed to locate fault site location and monitor the condition of generators in power networks. Finally, the disclosed methodology is validated in 14-bus IEEE standard power network under different scenarios (e.g., one generator fault, two-generator-fault, various aging levels, etc). The results illustrate the ability to locate fault site location and monitor the aging condition of generators in power networks. Compared to traditional condition monitoring and fault diagnosis based on generator sensors, the disclosed methodology can monitor a large number of generators based on a limited number of waveform sensors, which promises to reduce the cost of the maintenance and improve the reliability of the power grid.

Generators are playing a vital role in electrical power generation. Synchronous generators have been major means to generate electric power over a century. In recent years, due to the increased penetration of wind energy, the number of asynchronous generators have risen rapidly. Condition monitoring and fault diagnosis of large generators in power networks are gaining more interest since generator faults can lead to a catastrophic failure and then outages if not detected in the early stage. Due to aging or severe operating conditions, generators are subject to many different types of faults including stator faults, rotor electrical faults and rotor mechanical faults. Among these faults, stator winding inter-turn short fault due to the aging of winding insulation is the most dominant, which account for over 25% of faults in generators. When the interturn short fault is progressing, the condition of stator windings deteriorates and it can lead to catastrophic failures (e.g., phase-to-ground short circuit).

In the past decade, many condition monitoring and fault diagnosis methods for generators, including signal-based, model-based and data-driven, have been investigated. Motor current signature analysis (MCSA) based on the frequency analysis of the stator currents has been one of the most popular noninvasive condition monitoring and diagnosis methods. MCSA technique is mostly used to identify both rotor faults (e.g., bearing damage, broken rotor bar, eccentricity, end ring breakage, etc.) and stator faults (e.g., short circuit fault, etc.) based on slots related harmonics, third harmonic, the sideband frequency components, and the others. The frequency analysis of stator voltages is also used to detect stator winding inter-turn short faults in some operating conditions. Symmetrical component analysis, which decomposes stator current or voltage to positive sequence, negative-sequence, and zero-sequence components, is one of the alternative condition monitoring and fault diagnosis methods due to symmetry of stator windings under the healthy condition. Therefore, condition monitoring and fault diagnosis techniques based on generator sensors (e.g., voltage, current, vibration, etc.) have been widely used and promise to reduce unscheduled downtime, and maintenance costs.

When generators are connected in power networks, current/voltage signature signals of faulty electric machines will propagate through the power networks. The raw electrical waveform and signals (e.g., voltage, current, harmonics, power factor, etc.) in power networks will likely change, which contain rich information about condition of generators. Some waveform information (magnitude or phase) has been used to identify parameters of generators, however, the information was not used to monitor the aging condition of the generators for scheduled maintenance. In addition, for condition monitoring and fault diagnosis of generators, raw electrical waveforms at higher sampling rate besides magnitude and phase mentioned above might be needed as fault/deteriorating condition of generators will produce unusual harmonics.

According to various embodiments, the present disclosure relates to a signal processing methodology for generator condition monitoring and fault diagnosis based on strategically located waveform sensors 1703 in power networks with the goal to reduce the cost of the maintenance and improve the reliability of the power grid. Firstly, the equivalent model of synchronous generators is built short circuit faults. Secondly, the impact of generator short circuit faults is analyzed on strategically located electric waveform sensors 1703 in power networks. Thirdly, the 14-bus IEEE standard power network model is built in Matlab Simulink and different scenarios (e.g., one generator fault, two generator-fault, various aging levels, etc.) to produce a large set of electric waveform data for condition monitoring and fault diagnosis. Finally, based on the electrical waveform data in power networks, a data-driven signal analysis approach is disclosed to locate fault sources and estimate the aging levels of generators in power networks.

Analysis of Three-Phase Short Fault

When the short circuit faults happens in synchronous generators, the current could be multiple times of the rating current of the generator, which could bring catastrophic damages to the power grid.

Assume the generator operates at speed ω, then the flux linkage will be: $\psi=\Psi_0 \cos(\alpha_0+\omega t)$. And the fault happens at t=0, the induced current will produce $\Delta\psi$ to maintain the initial flux linkage $\psi_0$, so $\Delta\psi=\psi_0-\Psi_0\cos(\alpha_0+\omega t)$.

According to the flux linkage analysis above, stator current includes two parts: one is the DC component $i_{ap}$ generating the initial flux linkage $\psi_0$; the other one is the AC component i' at the synchronous frequency $$\left(f = \frac{\omega}{2\pi}\right),$$

which generates the rotating field to offset the rotor exciting field.

For the salient pole machine, to compensate the difference in magnetic resistance of d- and q-axis, there will be one additional AC component, the frequency of which is twice the synchronous frequency of the stator current. Therefore, three types of magnetic field will be induced by the stator. And these three magnetic fields will then change the flux linkage in the rotor winding. Therefore, to maintain its flux linkage in the rotor, the rotor will have similar armature reaction and induce three types of currents. Since the rotor is rotating at angular speed ω, frequencies of these currents will be: ω, 0 and −ω. It should be noted that −ω means the field rotates in the opposite direction.

The current components which will attenuate are referred to as free current $\Delta i$, while others are referred to as forced current $i_\infty$. The classification is shown in Table I.

TABLE I

Short Current Classification.

| | forced current $i_\infty$ | free current $\Delta i$ | |
| --- | --- | --- | --- |
| stator | $i_\infty$ | $\Delta i' = i' - i_\infty$ | $i_{ap}, i_{2\omega}$ |
| rotor | $i_{f[0]}$ | $\Delta i_{fa}$ | $\Delta i_{f\omega}$ |

According to the synchronous generator model and constant linkage theorem, the short circuit current of generators with damping windings could be deducted by:

$$i_a = -\frac{E_{q[0]}}{x_d}\cos(\omega t + \alpha_0) \tag{14}$$

$$-\left(\frac{E_{q0}^{\pi}}{x_d''} - \frac{E_{q[0]}}{x_d}\right)\exp(-t/T_d'')\cos(\omega t + \alpha_0)$$

$$-\left(\frac{E'_{q[0]}}{x'_d} - \frac{E_{q[0]}^d}{x_d}\right)\exp(-t/T'_d)\cos(\omega t + \alpha_0)$$

$$-\frac{E_{q0}^{"}}{x_d^{"}}\exp(-\tfrac{t}{\tau_q^{"}})\sin(\omega t + \alpha_0)$$

$$+\frac{U_{[0]}}{2}\left(\frac{1}{x_d^{"}} + \frac{1}{x_q^{"}}\right)\exp(-\tfrac{t}{\tau})\cos(\alpha_0 - \delta_0)$$

$$+\frac{U_{[0]}}{2}\left(\frac{1}{x_d^{"}} - \frac{1}{x_q^{"}}\right)\exp(-\tfrac{t}{\tau})\cos(2\omega + \alpha_0 + \delta_0)$$

Similarly, the rotor current can be obtained by:

$$i_f = i_{f[0]} \qquad (15)$$

$$+\left[\frac{x_{ad}x_\sigma DU_{[0]}\cos\delta_0}{(x_f x_D - x_{ad}^2)x_d^{"}} - \frac{(x_d - x_d')U_{[0]}\cos\delta_0}{x_{ad}x_d'}\right]\exp(-\tfrac{t}{\tau_d^{"}})$$

$$+\frac{(x_d - x_d')U_{[0]}\cos\delta_0}{x_{ad}x_d'}\exp(-\tfrac{t}{\tau_d'})$$

$$-\frac{x_{ad}x_\sigma DU_{[0]}}{(x_f x_D - x_{ad}^2)x_d^{"}}\exp(-\tfrac{t}{\tau_a})\cos(\omega t + \delta_0)$$

Impact of Generator Faults on Electric Waveforms in Power Networks

Figure 18:
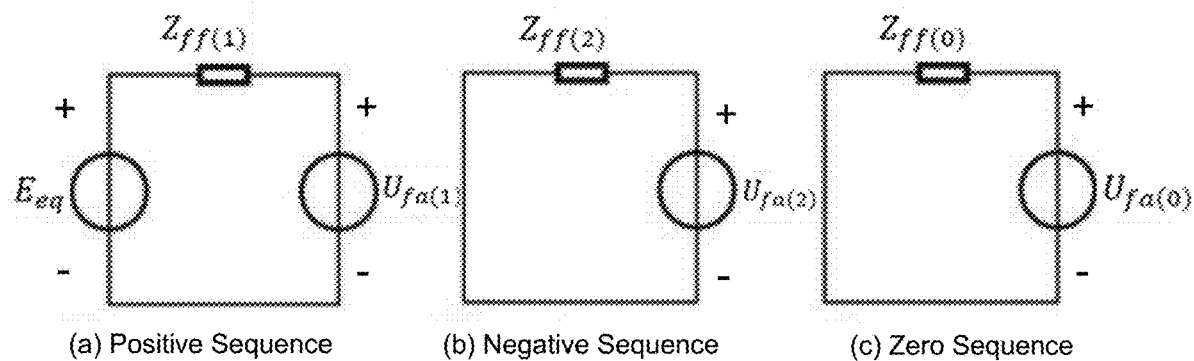
FIG. 18 illustrates an example diagram of equivalent circuits for each phase sequence according to various embodiments of the present disclosure.

To simplify the analysis of short circuit fault, the method of symmetrical components is used this section to analyze the impact of generator short circuit faults on the power networks. According to symmetrical components, any types of asymmetrical three-phase phasor could be decomposed to three symmetrical three-phase phasors. Take current for example, Equation (16) shows the relationship between currents in two coordinates. Phase b and phase c currents could be derived by similar equations.

$$\begin{bmatrix} i_{a(1)} \\ i_{a(2)} \\ i_{a(0)} \end{bmatrix} = \frac{1}{3}\begin{bmatrix} 1 & a & a^2 \\ 1 & a^2 & a \\ 1 & 1 & 1 \end{bmatrix}\begin{bmatrix} i_a \\ i_b \\ i_c \end{bmatrix} \qquad (16)$$

Where $a=e^{j120°}$, $a^2=e^{j240°}$; $\dot{I}_{a(1)}$, $\dot{I}_{a(2)}$, $\dot{I}_{a(0)}$ are the positive, negative and zero sequence of phase currents, respectively. Then sequence impedance is introduced to describe relationship between voltage and current in symmetrical components coordinate. Thevenin's equivalent circuit for sequence impedance is shown in FIG. 18. It should be noted that the asymmetrical components in sequence impedance are eliminated by adopting the asymmetrical voltage source and the transmission line reactances are modeled in $Z_{ff}$. For generality, the equivalent circuit equation could be derived by:

$$\dot{E}_{eq} - Z_{ff(1)}\dot{I}_{fa(1)} = \dot{U}_{fa(1)}$$

$$0 - Z_{ff(2)}\dot{I}_{fa(2)} = \dot{U}_{fa(2)}$$

$$0 - Z_{ff(0)}\dot{I}_{fa(0)} = \dot{U}_{fa(0)} \qquad (17)$$

Three more equations are needed to solve the equations with six (6) unknown variables, which are derived from the fault conditions. And common faults in power system include two phase short fault, two phase grounded short fault, etc. The related fault conditions are listed in Table II.

TABLE II

Common Fault Condition in Power System.

| fault category | fault condition | | |
|---|---|---|---|
| single phase short | $\dot{U}_{fa} = 0$ | $\dot{I}_{fb} = 0$ | $\dot{I}_{fc} = 0$ |
| two phases short | $\dot{I}_{fa} = 0$ | $\dot{I}_{fb} + \dot{I}_{fc} = 0$ | $\dot{U}_{fb} = \dot{U}_{fc}$ |
| two phases grounded | $\dot{I}_{fa} = 0$ | $\dot{U}_{fb} = 0$ | $\dot{U}_{fc} = 0$ |

Therefore, common asymmetric short faults could be solved by Equation (17) and the related fault equations listed in Table II. Other bus voltage and branch current in the normal condition could also be solved similarly. However, this method requires the detailed grid topology information and the accurate fault location, which may not be easy to acquire. In addition, to simulate multiple fault cases, this method is based on a strong assumption that the whole system is linear, which is hardly applicable in the real power system. Therefore, as shown below, an advanced signal processing technique will be disclosed to locate the fault source for condition monitoring and fault diagnosis.

Fault Identification and Location

In this section, we use the measured waveform data to identify and locate generator faults. Algorithm 5 shows how the whole process works.

Algorithm 5 Waveform based Generator Fault Identification and Location Algorithm 1: Input: Waveforms of voltage and current.
2: Output: Fault properties and location.
3: Event detection based on time series anomaly detection techniques;
4: Unbalance detection to distinguish single phase, double phase or three phase fault;
5: Event source region determination based on measurement changes;

The waveforms of voltage and current signals $V = [V_1, V_2, \ldots, V_N]^T$, $I = [I_1, I_2, \ldots, I_N]^T$ are measured from a network with size N the nodal, where depending on the number of phases at node i, $V_i$, and $I_i$, can be row vectors of size 1, 2 or 3. In order to characterize the waveform properties, we adopt instantaneous properties from:

$$s_c(t) = s(t) + j\mathcal{H}\{s(t)\} = A(t)e^{j\psi(t)} \qquad (18)$$

where $s(t)$ is the real signal, $s_c(t)$ is the complex expression, $A(t)$ is the instantaneous amplitude (IA) (envelope), $\psi(t)$ is the instantaneous phase (IP), $\mathcal{H}$ is the Hilbert transform as:

$$\mathcal{H}\{s(t)\} = \frac{1}{\pi}\int_{-\infty}^{\infty}\frac{s(\tau)}{t-\tau}d\tau. \qquad (19)$$

Thus, for a three phase current $I_n = [I_{nA}, I_{nB}, I_{nC}]^T$, where $$I_{nA} = A_{I_{nA}}e^{j\psi_I^{(t)}_{nA}}.$$

($V_N$ can be expressed in the same way.)

Event Detection

Before identifying the location of an event, the occurrence of such event should be detected. Thanks to the data-driven time series anomaly detection techniques, the presence of the event can be detected continuously. The changes of the nodal voltages and branch currents can be expressed as:

$$\Delta V_n = V_n(t) - V_n(t-w), \Delta I_{np} = I_{np}(t) - I_{np}(t-W) \quad (20)$$

where, w is the analysis window size, n and p denote two arbitrary neighboring nodes. If abnormal changes happen to $\Delta V_n$ and $\Delta I_{np}$, which indicate the difference between the pre and post-event, an event can be detected. Once the occurrence of an event is detected, the next step is to identify the types of the event and location of the root cause of the event.

Phase Unbalance Characterization

Figure 19:
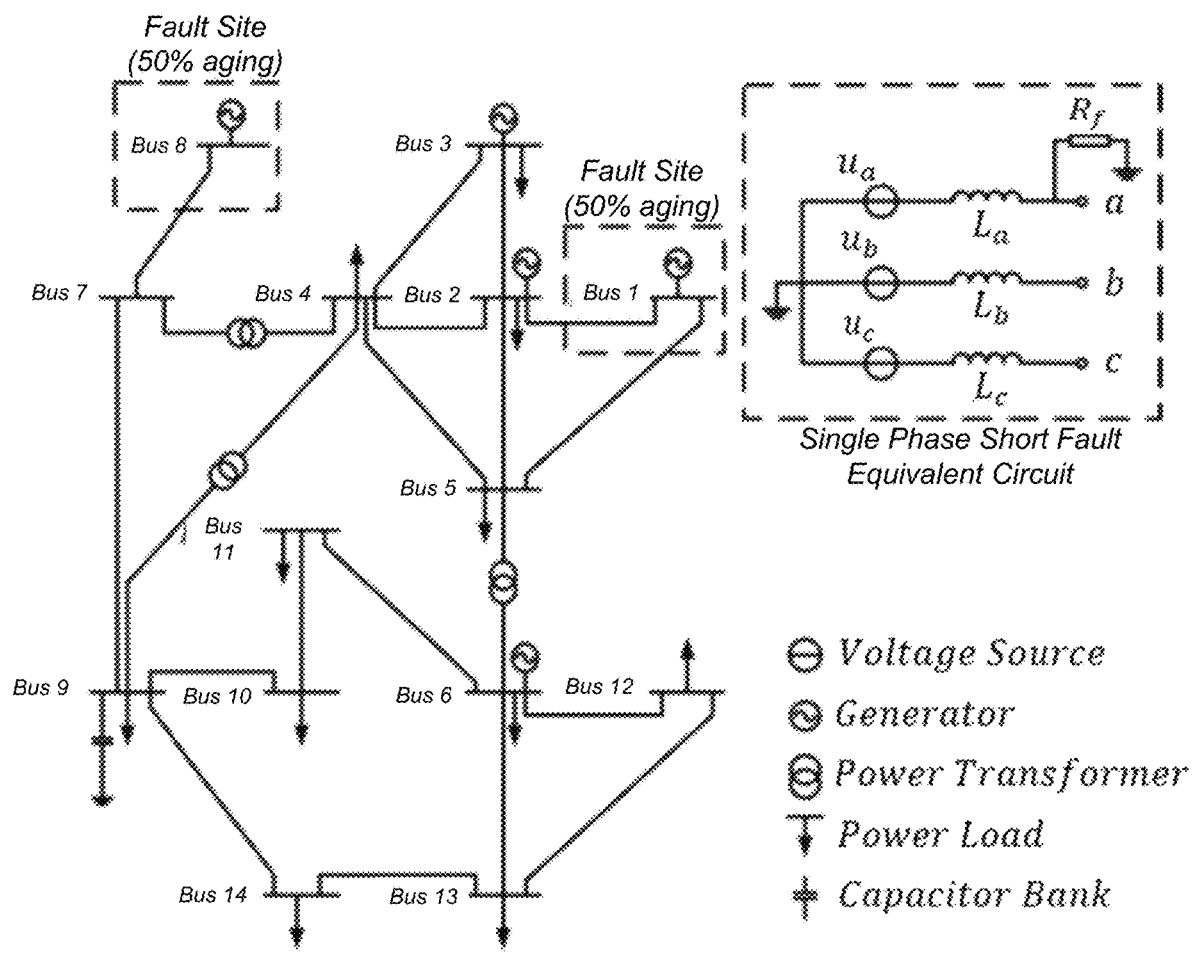
FIG. 19 illustrates an example schematic of an IEEE 14 Bus Power network according to various embodiments of the present disclosure.

Simulating the generator aging faults, single, two or even three phase issues can be met, which means the short circuit as shown in FIG. 19. The waveforms of Phases A, B, and C allow a relatively straightforward phase unbalance characterization based on direct comparisons of phase signal attributes.

Based on the IA, the current unbalance characterization functions $I_\alpha$, $I_\beta$ and $I_\gamma$ can be defined as:

$$I_{n\alpha} = \frac{1}{3} \sum_{\substack{i,j \in \{A,B,C\} \\ i \neq j}} (A_{I_{ni}} - A_{I_{nj}})^2 \quad (21)$$

$$I_{n\beta} = \frac{I_{max} - I_{min}}{I_{max}} \times 100\% \quad (22)$$

$$I_{n\gamma} = \sum_{\substack{i,j \in \{A,B,C\} \\ i \neq j}} \Gamma(A_{I_{ni}}, A_{I_{nj}}) \quad (23)$$

where, $I_{n,max} = \max\{A_{I_{nA}}, A_{I_{nB}}, A_{I_{nC}}\}$ and $I_{n,max} = \min\{A_{I_{nA}}, A_{I_{nB}}, A_{I_{nC}}\}$, $\Gamma$ denotes a thresholding function to measure the difference. Similarly, we can also get $V_\alpha$, $V_\beta$ and $V_\gamma$. If $I_\beta$ and $V_\beta$ is not zero, there exists unbalance among the three phases. Then we use $I_\gamma$ and $V_\gamma$ to determine the how many phases are affected. In addition, $I_\alpha$ and $V_\alpha$ are used to measure the absolute changes.

Identifying the Event Source Region

Assuming there are two waveform sets from two nodes, if it happens, an event may occur in three regions: upstream of node n, downstream of node p, and between nodes n and p. The measurements can be expressed as $M_n$ and $M_p$. Since we not only have the voltage and current, but also the unbalance measurements, $M_n$ can be defined as $$M_n = [I_{nA}, I_{nB}, I_{nC}, V_{nA}, V_{nB}, V_{nC}, I_\alpha, I_\beta, I_\gamma, V_\alpha, V_\beta, V_\gamma]^T \quad (24)$$

Then, event location can determined by the comparison between $\Delta M_n$ and $\Delta M_p$. For example, if the change patterns of $\Delta M_n$ and $\Delta M_p$ are the same, the event happens either on the upstream or downstream, but if those are different, the event happens between nodes n and p.

Simulation and Evaluation

For evaluation, a 14-bus IEEE standard power network (FIG. 19) is built to investigate the impact of the generator faults on electrical waveforms in power networks, which is also used to generate a large set of waveform data needed in the disclosed algorithms. In the simulation model, generators are simplified as non-ideal three-phase voltage sources, and the loads are modeled as constant power loads. Meanwhile, the transmission line reactances are modeled by Simulink block 'Three-Phase PI Section Line'. And the parameters are calculated from the IEEE standard 14-bus testbed datasheet. Specifically, the level of the short fault or the aging degree is modeled as a short circuit resistance, $R_f$, as shown in FIG. 19 (only depict the single phase grounded short fault for example). $R_f$ is modeled as $R_f = 10^{(S-10 * \kappa_{aging})}$, where $\kappa_{aging}$ denotes the generator condition aging level.

Figure 20:
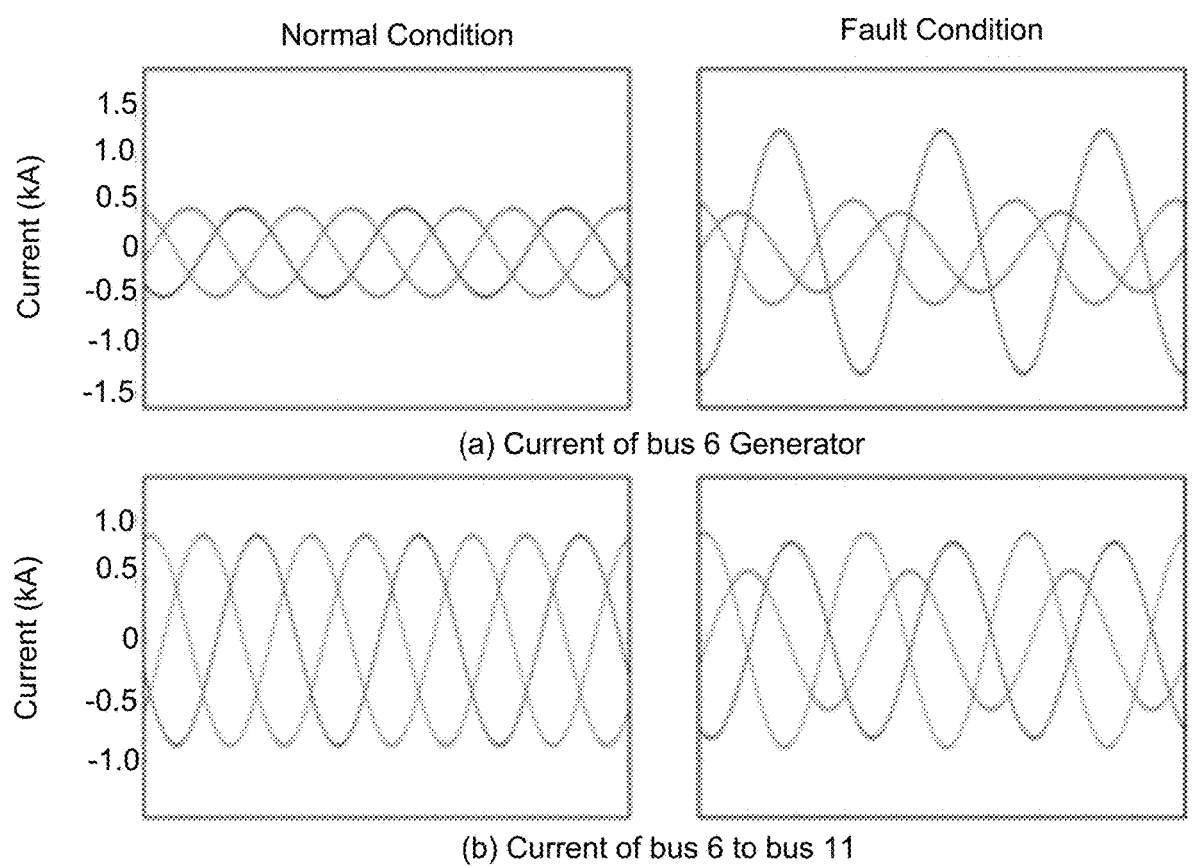
FIG. 20 illustrates example graphical representations of the single phase short fault simulation results according to various embodiments of the present disclosure.

When two generators highlighted in FIG. 19 have aging stator windings both at 50% level, their voltage and current signature will change and will likely impact raw electrical waveforms and signals (e.g., voltage, current, harmonics, power factor, etc.) in power networks (e.g., voltage, current, etc) due to waveform and signal propagation. As a result, the voltage and current waveforms in bus 6 generator and bus from 6 to 11 are significantly impacted as shown in FIG. 20. The traditional approaches based on machine sensors, for instance, sensors in bus 6 generator, cannot distinguish whether bus 6 generator is faulty or not. To address this challenges, an advanced signal processing approach is disclosed based on strategically located waveform sensors. The proposed data-driven approach utilizes waveforms as well as derived signal attributes to characterize the dynamic relationships among limited sensors to deduce the actual fault locations, which may not be monitored. Based on the model shown in FIG. 19, two generator faults are simulated, which are located at G1 and G8 with 50% aging. There are 14 nodes in the grid, and typically all generators (5) and transformers (3) should have built-in sensors, so there could be 8 sensors in the traditional power networks. In the experiment, four sensors are used from Nodes 1, 6, 7, and 14 to simulate the limited sensor situation. Based on the V, function, it can be known only Phase A has the short circuit event. Although observations from Nodes 7 and 14 indicate differences between Phases B and C, the small deviations should be caused be the unbalanced Phase A current rather than more than one phase short circuit.

Next, the root source region can be detected. Table III

TABLE III

Unbalance metrics of Nodes 1, 6, 7, 14

| Node # | 1 | 6 | 7 | 14 |
|---|---|---|---|---|
| $V_\beta$ | 0.832 | 0.328 | 0.511 | 0.383 |
| $I_\beta$ | (1-2) 0.922 | (G6) 0.6865 | (B4) 0.269 | (B14) 0.390 |
|  | (1-5) 0.825 | (6-11) .359 | (7-8) 0.887 | N/A |
|  | N/A | (6-12) 0.181 | (7-9) 0.627 | N/A |
|  | N/A | (6-13) 0.366 | N/A | N/A |

From Table III, $I_\beta$ is the largest for IG6, which means the major unbalance source for Node 6 is from the Node 5 direction. (If Node 6 is the fault source, the current unbalance metrics between 6 and 11, 12, 13 would be similar.) So the fault source could be Nodes 1, 2 or 3. However, if Node 2 or 3 is the fault source, the current measured at Node 7 about Bus 4 would display more obvious unbalances. While, Node 1 could be the source, as both its voltage and current are not balanced.

Furthermore, Node 1 can be checked to determine if it is one only fault source. If yes, the unbalanced current metrics from Table III should show largest value from Bus 4 instead of current between Nodes 7 and 8. Thus, for Node 7, the major fault source is from Node 8, which is also a generator. So, Nodes 1 and 8 are decided to be the two fault sources.

In addition, based on the current and voltage changes, the following are estimated: $\hat{R}_{f1} = 9.17\Omega$ and $\hat{R}_{f8} = 1.35\Omega$. According to the relation between $R_f$ and $\kappa_{aging}$, $\kappa_{aging}^{G1} = 40.3\%$ and $\kappa_{aging}^{G1} = 48.7\%$ The aging percentage estimation for Node 8 is close to the ground truth 50%, while there is still space for improvement as $\kappa_{aging}^{G1}$ is not accurate.

Note that the measurements from Node 14 are not useful in the experiment, so only three nodes are used to locate the event source. There are two remarks: (1) limited measurements can be used to monitor the whole network; (2) the observation selection (sensor location) should be considered carefully to get the maximum information using minimum sensors and avoid recording useless information.

Additional improvements include preprocessing of the raw energy meter data. In some embodiments, the actual anomalies can be tracked. For example, the anomaly type can be categorized, such as intrusion, logic error, or some other types of anomaly by the constructed sequence. According to various implementations, the algorithms can be enhanced for more stability and compatibility. Finally, the deployment of the system and hardware design are also important for the framework. It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Although the condition detection system 115 and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

Examples of the embodiments of the present disclosure can be described in view of the following clauses:

Clause 1. A system, comprising: an electrical device coupled to a network; an energy meter coupled to with the electrical device, the energy meter device configured to monitor an energy profile of the electrical device; and at least one application executable in a computing device coupled to the energy meter, wherein, when executed, the at least one application causes the computing device to at least: analyze energy profile data of the electrical device, the energy profile data being received from the energy meter based on the monitoring of the energy profile; monitor one or more conditions of the electrical device based on the energy profile data; detect one or more anomaly in the electrical device based on a change in the one or more conditions; and diagnose one or more root causes of the one or more anomaly based at least in part on one or more characteristics in the energy profile data.

Clause 2. The system of clause 1, wherein the energy profile data includes at least one of voltage measurements, current measurements, or power measurements.

Clause 3. The system of clauses 1 to 2, wherein analyzing the energy profile data comprises comparing the energy profile data with one or more energy profile models.

Clause 4. The system of clause 3, wherein, when executed, the at least one application further causes the at least one computing device to at least identify a type of attack associated with the anomaly based at least in part one or more characteristics in the energy profile data.

Clause 5. The system of clauses 1 to 4, wherein detection of the anomaly is based at least in part on Finite State Machine (FSM) reconstruction.

Clause 6. The system of clauses 1 to 5, wherein, when executed, the at least one application further causes the at least one computing device to at least reconstruct an energy profile model based at least in part on the energy profile data.

Clause 7. The system of clauses 1 to 6, wherein detection of the anomaly is based at least in part on cross-correlation.

Clause 8. The system of clauses 1 to 7, wherein the electrical device comprises an internet of things (IoT) device or an electrical appliance.

Clause 9. The system of clauses 1 to 8, wherein analyzing the energy profile data further comprises analyzing waveform data associated with the electrical device.

Clause 10. The system of clauses 1 to 9, wherein the anomaly is a result of a cyber-attack, a physical attack, a hardware malfunction, or a software malfunction.

Clause 11. A method for detecting an anomaly in an electrical device, comprising: monitoring, via an energy meter coupled to the electrical device, energy profile data of the electrical device; comparing the energy profile data with one or more energy profile models; and detecting an anomaly associated with the electrical device based at least in response to the comparing of the energy profile data with the one or more energy profile models.

Clause 12. The method of clause 11, wherein the energy profile data comprises at least one or more of voltage data, current data, or power data.

Clause 13. The method of clauses 11 to 12, further comprising identifying a type of attack associated with the anomaly based at least in part on one or more characteristics in the energy profile data.

Clause 14. The method of clauses 11 to 13, wherein detection of the anomaly is based at least in part on cross-correlation.

Clause 15. The method of clauses 11 to 14, wherein detection of the anomaly is based at least in part on Finite State Machine (FSM) reconstruction.

Clause 16. The method of clauses 11 to 15, further comprising notifying an entity of the detection of the anomaly.

Clause 17. The method of clauses 11 to 16, wherein the anomaly is a result of a cyber-attack, a physical attack, hardware malfunction, or software malfunction.

Clause 18. A system, comprising: a power network comprising a plurality of electrical components; and an electrical waveform auditing device coupled to the power network, the electrical waveform auditing device being configured to: receive electrical waveform data associated with the power network; monitor one or more conditions of the plurality of electrical components in the power network based on the electrical waveform data; detect an anomaly in at least one of the electrical components based at least in part on a change in the one or more conditions; and diagnose one or more root causes of the anomaly based at least in part on one or more characteristics in the electrical waveform data.

Clause 19. The system of clause 18, wherein the power network comprises at least one of: an electrical vehicle power network, a home power network, a building power network, a manufacturing system power network, a microgrid, a power distribution network, a power transmission network, or a power generating network.

Clause 20. The system of clause 18 or 19, wherein the type of anomaly is at least one of: a cyber threat, a physical threat, a hardware malfunction, or a software malfunction.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

We claim:

1. A system, comprising:
   an electrical device coupled to a network;
   an energy meter coupled to the electrical device, the energy meter configured to monitor an energy profile of the electrical device, the energy meter isolated from an internet of things (IoT) system including the electrical device; and
   at least one application executable in a computing device coupled to the energy meter, wherein, when executed, the at least one application causes the computing device to at least:
     analyze energy profile data of the electrical device, the energy profile data being received from the energy meter based on the monitoring of the energy profile;
     monitor one or more conditions of the electrical device based on the energy profile data;
     detect an anomaly in the electrical device based on a change in the one or more conditions;
     determine a type of anomaly based at least in part on a trained classification model; and
     diagnose a root cause of the anomaly based at least in part on one or more characteristics in the energy profile data and the type of anomaly, the root cause comprising at least one of a threat source or a malfunctioning component of the electrical device.

2. The system of claim 1, wherein the energy profile data includes at least one of voltage measurements, current measurements, or power measurements.

3. The system of claim 1, wherein analyzing the energy profile data comprises comparing the energy profile data with one or more energy profile models.

4. The system of claim 3, wherein, when executed, the at least one application further causes the at least one computing device to at least identify a type of attack associated with the anomaly based at least in part one or more characteristics in the energy profile data.

5. The system of claim 1, wherein detection of the anomaly is based at least in part on Finite State Machine (FSM) reconstruction.

6. The system of claim 1, wherein, when executed, the at least one application further causes the at least one computing device to at least reconstruct an energy profile model based at least in part on the energy profile data.

7. The system of claim 1, wherein detection of the anomaly is based at least in part on cross-correlation.

8. The system of claim 1, wherein the electrical device comprises an internet of things (IoT) device or an electrical appliance.

9. The system of claim 1, wherein analyzing the energy profile data further comprises analyzing waveform data associated with the electrical device.

10. The system of claim 1, wherein the anomaly is a result of a cyber-attack, a physical attack, a hardware malfunction, or a software malfunction.

11. A method for detecting an anomaly in an electrical device, comprising:
    monitoring, via an energy meter coupled to the electrical device, energy profile data of the electrical device, wherein the energy meter is isolated from an internet of things (IoT) system including the electrical device;
    comparing the energy profile data with one or more energy profile models, the one or more energy profile models based at least in part on expected behavior of the electrical device; and
    detecting an anomaly associated with the electrical device based at least in response to the comparing of the energy profile data with the one or more energy profile models; and
    determining a type of anomaly based at least in part on the energy profile data and a classification model.

12. The method of claim 11, wherein the energy profile data comprises at least one or more of voltage data, current data, or power data.

13. The method of claim 11, further comprising identifying a type of attack associated with the anomaly based at least in part on one or more characteristics in the energy profile data.

14. The method of claim 11, wherein detection of the anomaly is based at least in part on cross-correlation.

15. The method of claim 11, wherein detection of the anomaly is based at least in part on Finite State Machine (FSM) reconstruction.

16. The method of claim 11, further comprising notifying an entity of the detection of the anomaly.

17. The method of claim 11, wherein the anomaly is a result of a cyber-attack, a physical attack, hardware malfunction, or software malfunction.

18. A system, comprising:
    a power network comprising a plurality of electrical components; and an electrical waveform auditory device coupled to the power network, the electrical waveform auditory device isolated from the plurality of electrical components, the electrical waveform auditory device being configured to:
receive electrical waveform data associated with the power network;
monitor one or more conditions of the plurality of electrical components in the power network based on the electrical waveform data;
detect an anomaly in at least one of the electrical components based at least in part on a change in the one or more conditions; and
diagnose a root cause of the anomaly based at least in part on one or more characteristics in the electrical waveform data and a type of anomaly, the root cause comprising at least one of a threat source or a malfunctioning component of the plurality of electrical components.

19. The system of claim 18, wherein the power network comprises at least one of: an electrical vehicle power network, a home power network, a building power network, a manufacturing system power network, a microgrid, a power distribution network, a power transmission network, or a power generating network.

20. The system of claim 18, wherein the type of anomaly is at least one of: a cyber threat, a physical threat, a hardware malfunction, or a software malfunction.

* * * * *